US009096147B2

(12) United States Patent
Kulkarni et al.

(10) Patent No.: US 9,096,147 B2
(45) Date of Patent: Aug. 4, 2015

(54) CONTROLLABLE COMFORT SHELL FOR VEHICLE SEAT

(75) Inventors: Amit Kulkarni, Troy, MI (US); David Goligorsky, Cambridge, MA (US); Timothy R. Proulx, Nashua, NH (US); Yang Cao, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 4 days.

(21) Appl. No.: 13/612,683

(22) Filed: Sep. 12, 2012

(65) Prior Publication Data

US 2013/0241255 A1 Sep. 19, 2013

Related U.S. Application Data

(60) Provisional application No. 61/533,616, filed on Sep. 12, 2011.

(51) Int. Cl.
*B60N 2/02* (2006.01)
*B60N 2/66* (2006.01)

(52) U.S. Cl.
CPC *B60N 2/028* (2013.01); *B60N 2/66* (2013.01); *Y10T 29/49826* (2013.01)

(58) Field of Classification Search
CPC ........... B60N 2/028; B60N 2/643; B60N 2/66
USPC .......................... 297/284.1, 284.2, 284.4, 285
See application file for complete search history.

(56) References Cited

U.S. PATENT DOCUMENTS

| | | | | |
|---|---|---|---|---|
| 3,565,482 | A * | 2/1971 | Blodee | 297/284.3 |
| 6,309,018 | B1 * | 10/2001 | Jernstrom | 297/284.1 |
| 7,021,706 | B2 | 4/2006 | Aufrere et al. | |
| 7,066,537 | B2 * | 6/2006 | Coffield et al. | 297/284.4 |
| 7,611,199 | B2 * | 11/2009 | Michalak et al. | 297/300.2 |
| 7,909,402 | B2 * | 3/2011 | Chu et al. | 297/284.3 |
| 2005/0184568 | A1 * | 8/2005 | Schmidt et al. | 297/284.4 |
| 2008/0136240 | A1 | 6/2008 | Matthews et al. | |
| 2011/0121624 | A1 * | 5/2011 | Brncick et al. | 297/284.2 |

OTHER PUBLICATIONS

International Search Report for PCT/US2012/054933, Feb. 28, 2013, 3 pages.
Written Opinion for PCT/US2012/054933, Feb. 28, 2013, 5 pages.

* cited by examiner

Primary Examiner — Philip Gabler
(74) Attorney, Agent, or Firm — Reising Ethington P.C.

(57) ABSTRACT

A vehicle seat includes a seat back having a support frame coupled to a seat foundation. The seat back also further includes a deformable seat shell adapted to assume various shapes between initial position and final positions in response to variable rearward loads applied by a seated passenger. The seat shell is coupled to the support frame by a compliant shell-motion controller via upper and lower motion-control links. The motion-control links allow pivotal motion, and at least one of the links includes a spheroidal joint. A link foundation extends between and interconnects the upper and lower motion-control links and is coupled to the support frame so that the link foundation does not move during seat shell deformation. The shell-motion controller may be pre-assembled as part of a backrest or the motion-control links may be formed after the link foundation is attached to the support frame.

11 Claims, 22 Drawing Sheets

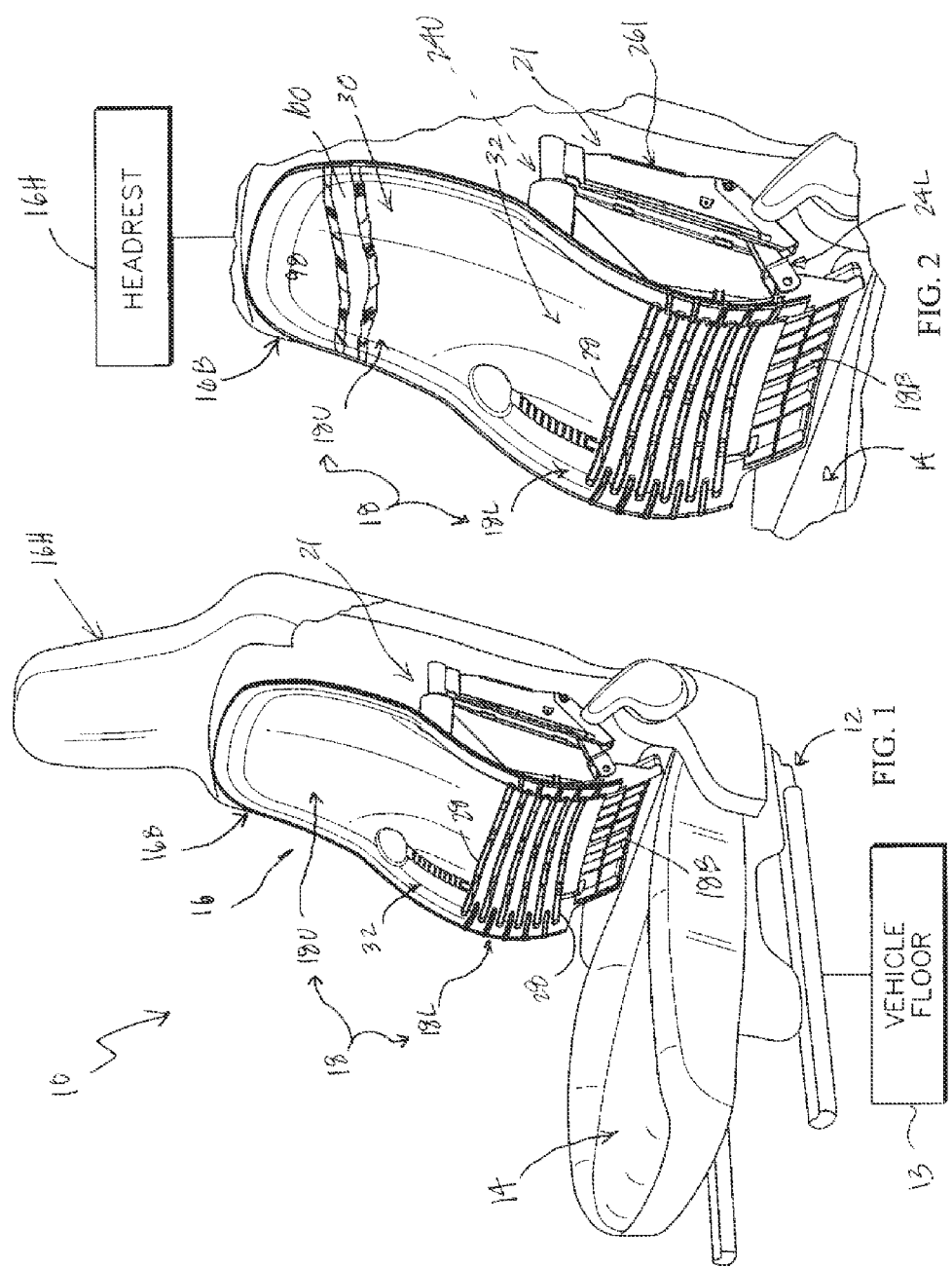

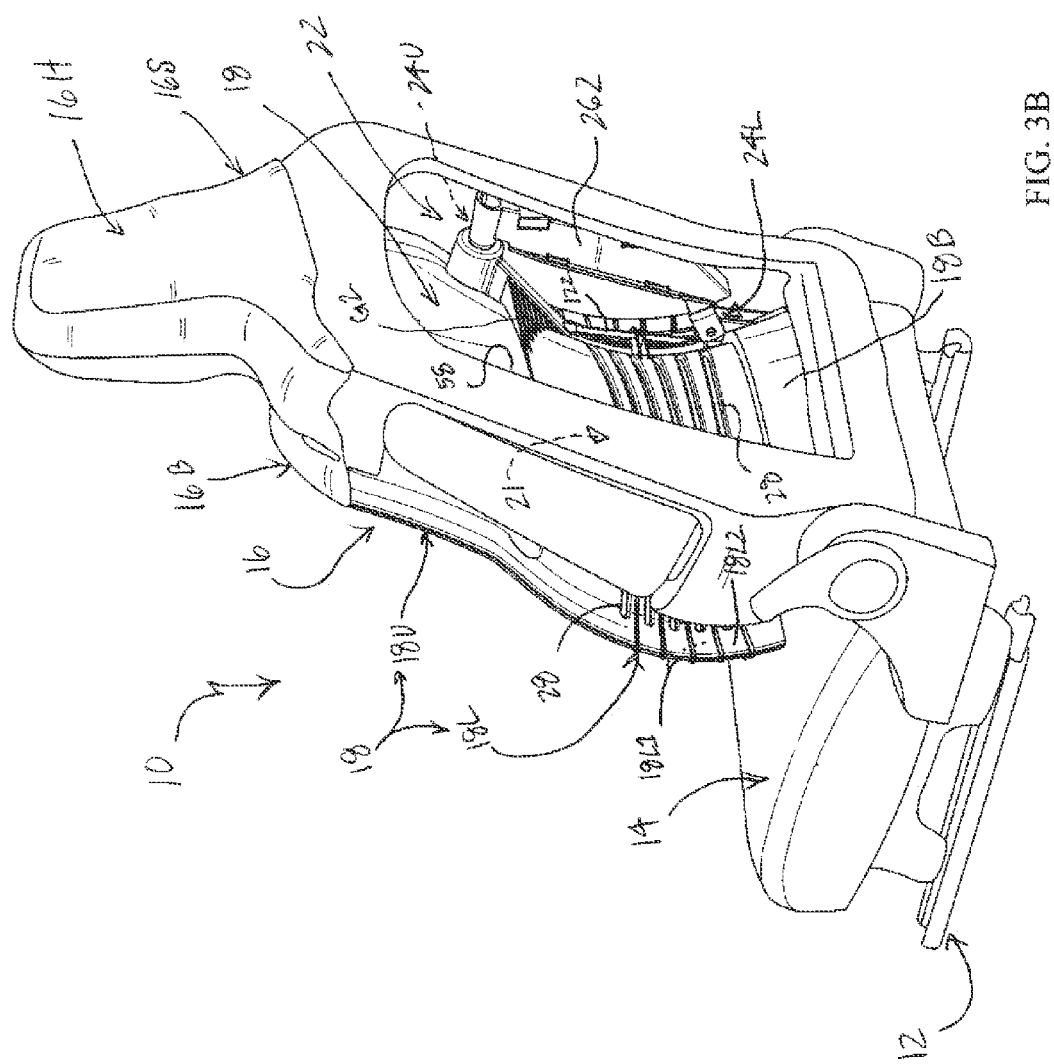

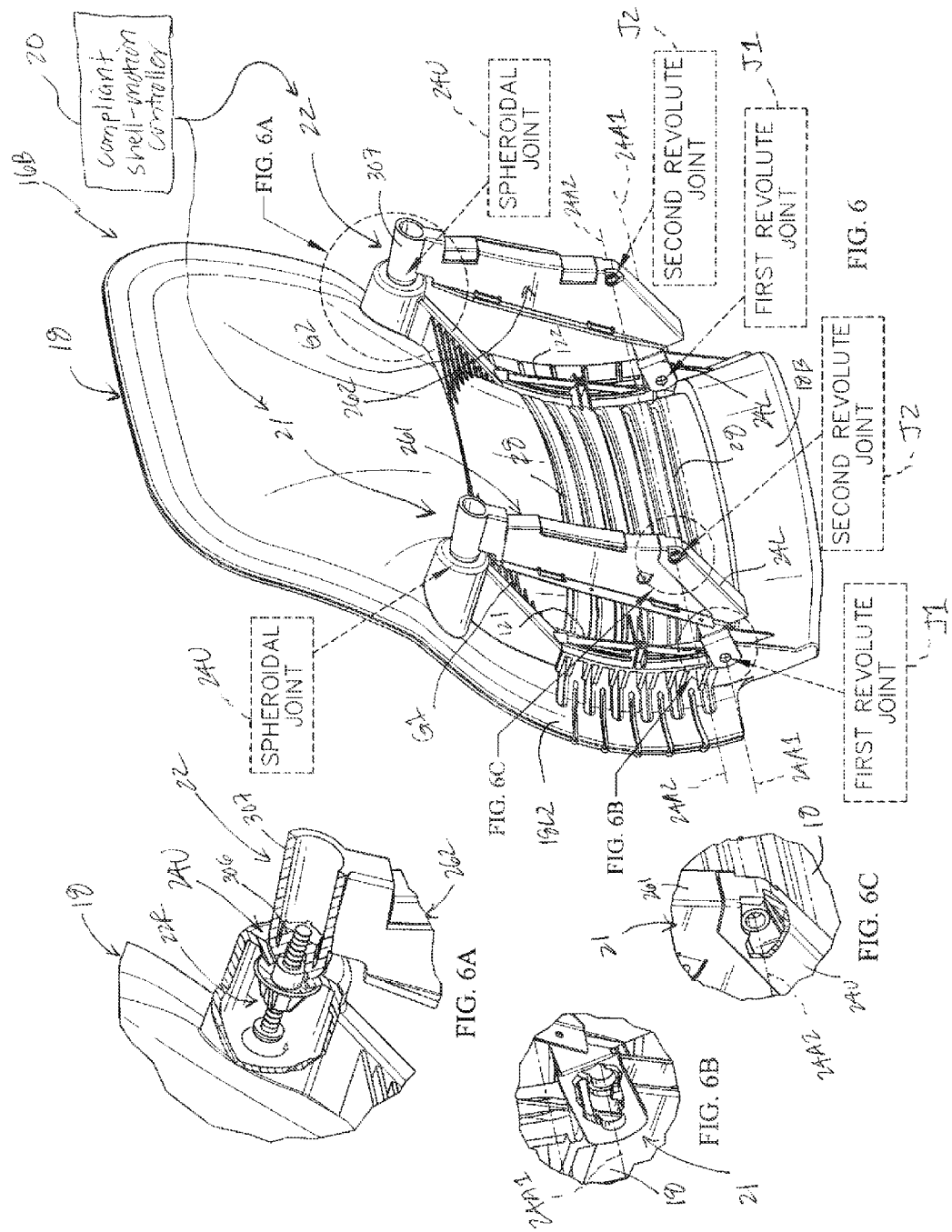

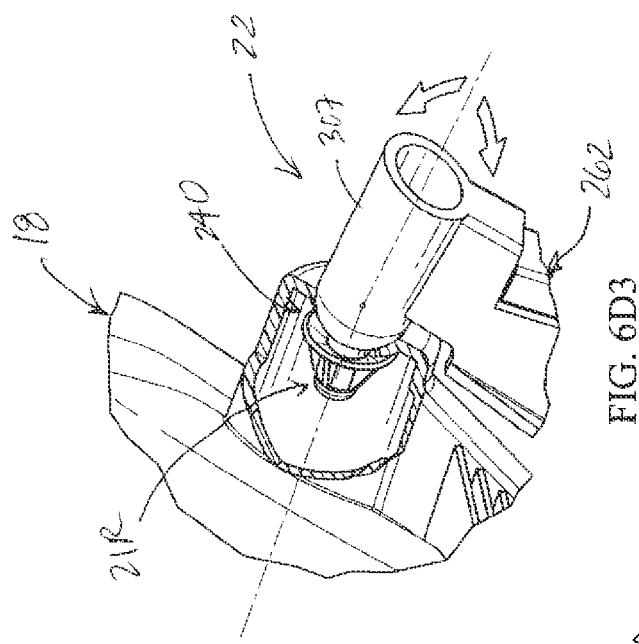
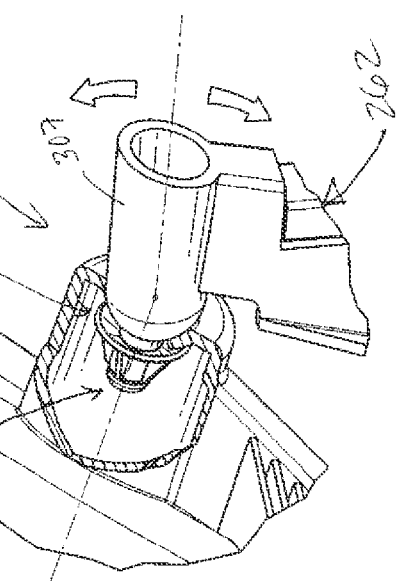
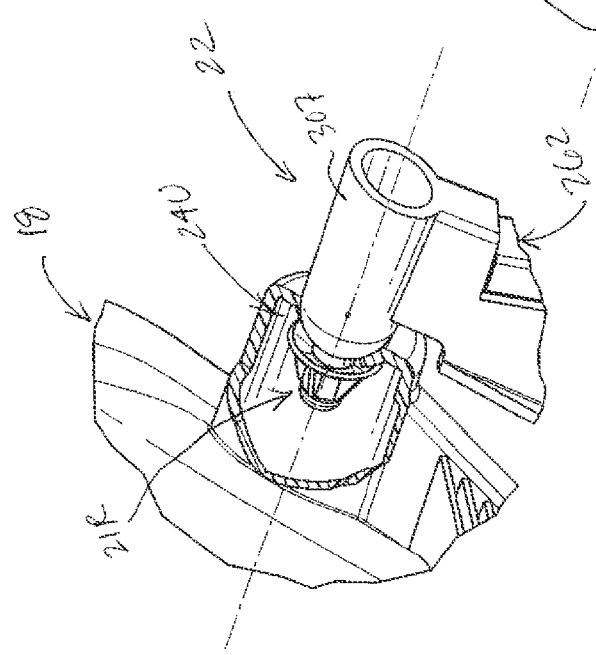
FIG. 6D1  FIG. 6D2  FIG. 6D3

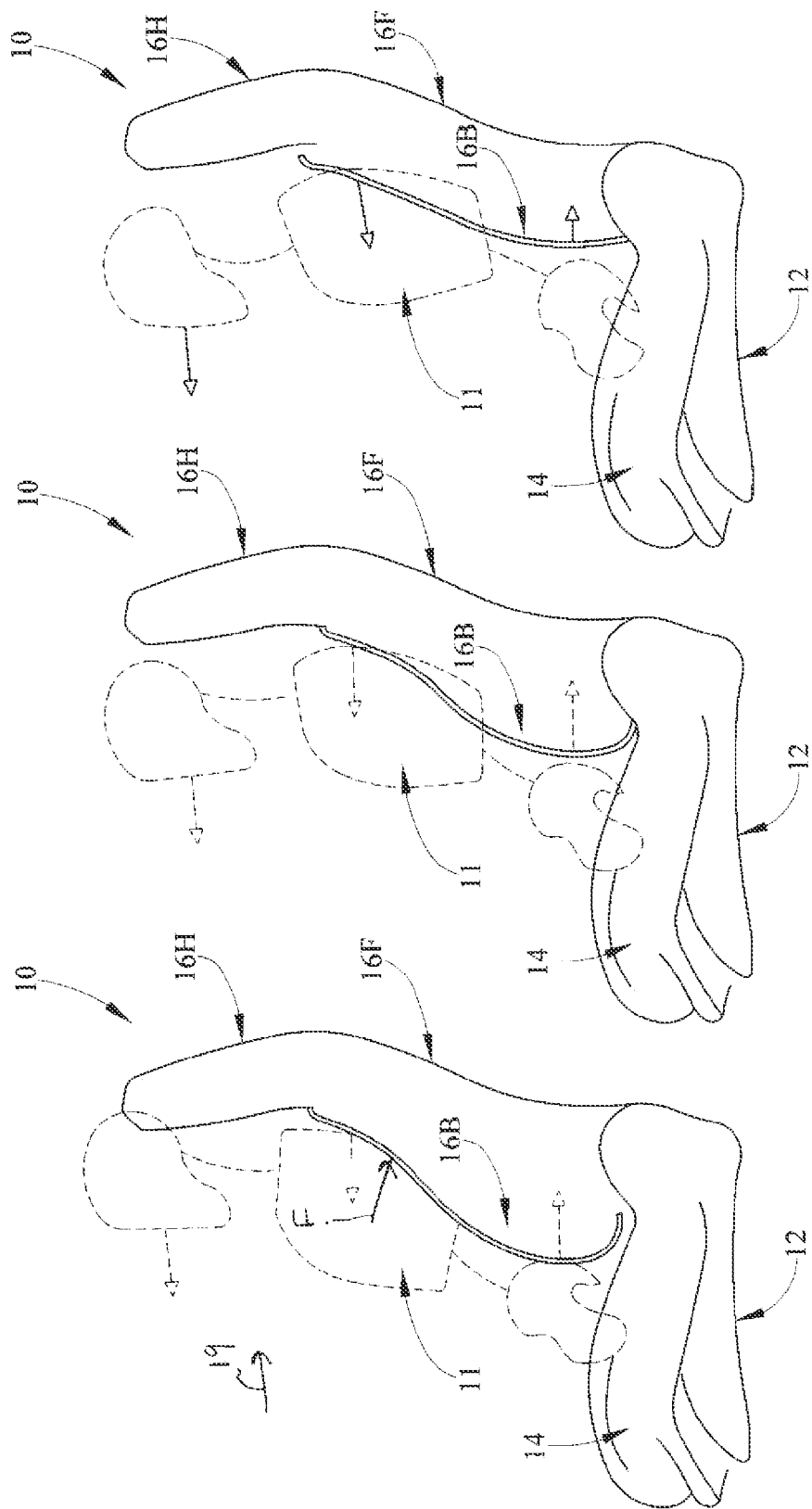

CONTROLLABLE COMFORT SHELL FOR VEHICLE SEAT

CROSS-REFERENCE TO RELATED APPLICATION

This application claims the benefit of U.S. Provisional Ser. No. 61/533,616 filed on Sep. 12, 2011, the entire contents of which are incorporated herein by reference.

TECHNICAL FIELD

The present disclosure relates to a vehicle seat, and particularly to a seat including an expandable and contractable portion. More particularly, the present disclosure relates to a vehicle seat including a seat back having a variable shape.

BACKGROUND

Vehicle seats typically include a generally horizontal seat bottom and a generally upright seat back. Vehicle occupants are seated on the seat bottom, which normally includes cushioning for comfort. The seat back may also include cushioning for comfort, but because of the upright position of the seat back, the occupant's weight is not always useful to ensure a comfortable, conforming fit of the seat back with the occupant's body. Further, not all vehicle occupants sit with the same posture. Some occupants sit in a relatively upright position, while others may sit in a slumping position. These different postures place parts of the occupant's body in different physical locations from each other. Thus, a seat back with a fixed shape or contour is likely to properly fit and support only a small portion of possible occupants. While some seat backs are constructed with a user selectable contour, there are typically only a finite number of contours to select from, which may or may not be suitable for a particular occupant. In addition, an occupant may shift in his or her seat from time to time. This shifting can resulting in changes in posture so that even a properly adjusted seat back contour becomes improper without additional adjustment to suit the occupant's shifted position.

SUMMARY

According to the present disclosure, a vehicle seat includes a seat bottom and a seat back extending upwardly from the seat bottom. The seat back includes a seat foundation under the seat bottom and a backrest coupled to the seat foundation.

In illustrative embodiments, the backrest includes a support frame coupled to the seat foundation, a deformable seat shell, and a compliant shell-motion controller configured to provide means for supporting the deformable seat shell for predictable shape-changing movement relative to the support frame from an initial (lordosis) position to a final (kyphosis) position in response to a force applied to the deformable seat shell in a direction toward the support frame by a passenger sitting on the seat bottom as the passenger moves around and changes position in the vehicle seat so that a back of the passenger is supported automatically by the deformable seat shell in a customized manner regardless of the posture of the seated passenger. The compliant shell-motion controller is located between and coupled to the support frame and the deformable seat shell.

In illustrative embodiments, the compliant shell-motion controller includes a link foundation coupled to the support frame to lie in a fixed position relative to the support frame during shape-changing movement of the deformable seat shell relative to the support frame. The compliant shell-motion controller also includes upper and lower motion-control links that are arranged to lie between and to interconnect the link foundation to the deformable seat shell to cause the deformable seat shell to move in a controlled manner relative to the link foundation when the deformable seat shell is exposed to external forces generated by a passenger moving around and changing position in the vehicle seat. In illustrative embodiments, the upper motion-control link is a spheroidal (ball-and-socket) joint comprising a ball coupled to the link foundation and a ball-receiving socket coupled to the deformable seat shell. The lower motion-control link is a pivotable strut coupled at an inner end thereof to a gusset included in the deformable seat shell for pivotable movement about a first pivot axis and coupled at an outer end thereof to the link foundation for pivotable movement about a second pivot axis that is arranged to lie in spaced-apart parallel relation to the first pivot axis.

In illustrative embodiments, the deformable seat shell extends laterally across the width of the support frame. The compliant shell-motion controller includes a first shell mount coupled to a first (near) side of the deformable seat shell and a second shell mount coupled to a second (far) side of the deformable seat shell and arranged to lie in laterally spaced-apart relation to the first shell mount.

In accordance with one embodiment, there is provided a vehicle seat that includes a foundation adapted for attachment to a vehicle floor and an upwardly extending support frame coupled to the foundation. The seat further includes a deformable seat shell adapted to assume various shapes between an initial lordosis position and a final kyphosis position in response to variable rearward loads applied by the torso of a seated passenger. A compliant shell-motion controller couples the deformable seat shell with the support frame via upper and lower motion-control links. The upper motion-control link includes a spheroidal joint and the lower motion-control link includes a pivotable strut.

In accordance with another embodiment, there is provided a vehicle seat that includes a foundation adapted for attachment to a vehicle floor and an upwardly extending support frame coupled to the foundation. The seat further includes a deformable seat shell adapted to assume various shapes between an initial lordosis position and a final kyphosis position in response to variable rearward loads applied by the torso of a seated passenger. A stationary link foundation includes a holster coupled to the support frame at a fixed location, and the holster is formed separately from the support frame. Upper and lower motion-control links each pivotally couple the holster with the deformable seat shell, and the holster extends between and interconnects the upper and lower motion-control links.

In accordance with another embodiment, there is provided a method of making a vehicle seat having a backrest with a deformable seat shell. The method includes the steps of: (a) coupling first and second holsters of a compliant shell-motion controller with the deformable seat shell via upper motion-control links that include spheroidal joints; (b) coupling the first and second holsters with the deformable seat shell via lower motion-control links that include pivotable struts; and (c) coupling the first and second holsters with a seat back support frame at a fixed location so that the holsters do not move relative to the support frame.

In accordance with another embodiment, there is provided a method of making a backrest for use with a vehicle seat. The method includes the steps of: (a) coupling first and second holsters of a compliant shell-motion controller with a deformable seat shell via upper motion-control links that include spheroidal joints; and (b) coupling the first and second holsters with the deformable seat shell via lower motion-control links that include pivotable struts.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

Preferred exemplary embodiments will hereinafter be described in conjunction with the appended drawings, wherein like designations denote like elements, and wherein:

FIG. 1 is a front perspective view of an illustrative vehicle seat including a seat back mounted on an underlying seat foundation coupled to a floor of a vehicle, where the seat back includes a backrest having a deformable seat shell;

FIG. 2 is a partial cutaway view of the seat of FIG. 1;

FIG. 3B is a rear partially cutaway view of the vehicle seat of FIG. 1;

FIG. 6 is a rear perspective view of the backrest of FIG. 1 shown separated from the remainder of the seat;

FIG. 6A is an enlarged partial cutaway view of an upper motion-control link of FIG. 6, showing a spheroidal joint capable of motion around an indefinite number of axes which have one common center;

FIG. 6B is an enlarged partial cutaway view of a first revolute joint of FIG. 6;

FIG. 6C is an enlarged partial cutaway view of a second revolute joint of FIG. 6;

FIGS. 6D1-6D3 are partial cutaway views of the spheroidal joint of FIG. 6A showing motion around an indefinite number of axes;

FIG. 16 is a side view of one embodiment of a vehicle seat, showing a passenger sitting in an upright position with the deformable seat shell in the initial (lordosis) position;

FIG. 17 is a side view of the vehicle seat of FIG. 16, showing the passenger sitting in a mid-range position with the deformable seat shell in the transition position;

FIG. 18 is a side view of the vehicle seat of FIG. 16, showing the passenger sitting in a slouch position with the deformable seat shell in the final (kyphosis) position;

DETAILED DESCRIPTION

Figure 3A:
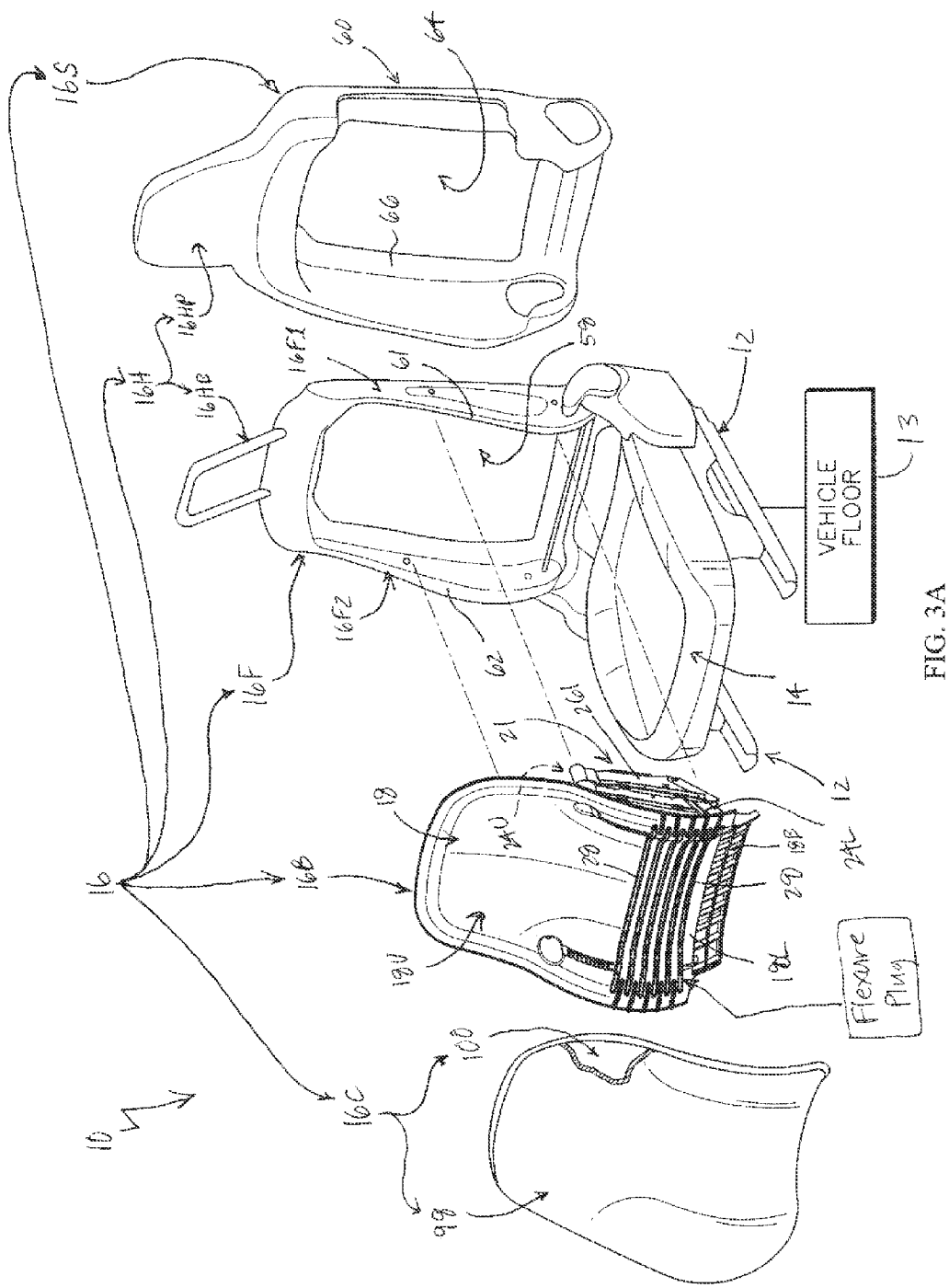
FIG. 3A is an exploded view of the vehicle seat of FIG. 1.

A vehicle seat 10 includes a seat foundation 12 adapted to be anchored to a vehicle floor 13, a seat bottom 14 mounted on seat foundation 12, and a seat back 16 arranged to extend upwardly from seat bottom 14 as suggested in FIGS. 1-3B. Seat back 16 includes a backrest 16B that is made in accordance with the present disclosure to provide a compliant shell system that provides custom lumbar support to upright-sitting, position-changing, and slouching passengers seated on vehicle seat 10 as suggested, for example, in FIGS. 13-15 and 16-18.

Figure 4:
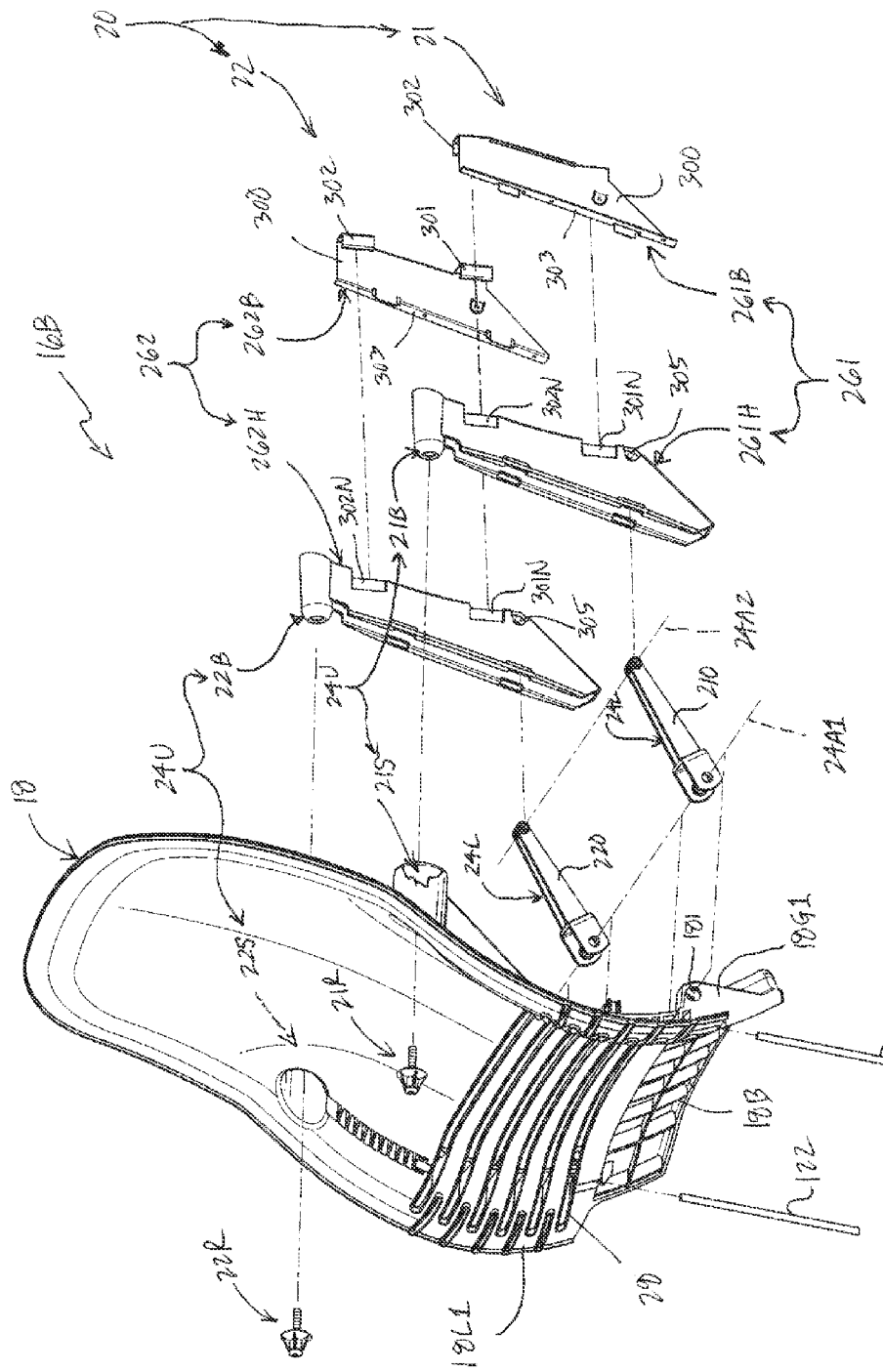
FIG. 4 is an exploded front perspective view of the backrest of FIG. 1, including the deformable seat shell and a compliant shell-motion controller.
Figure 5:
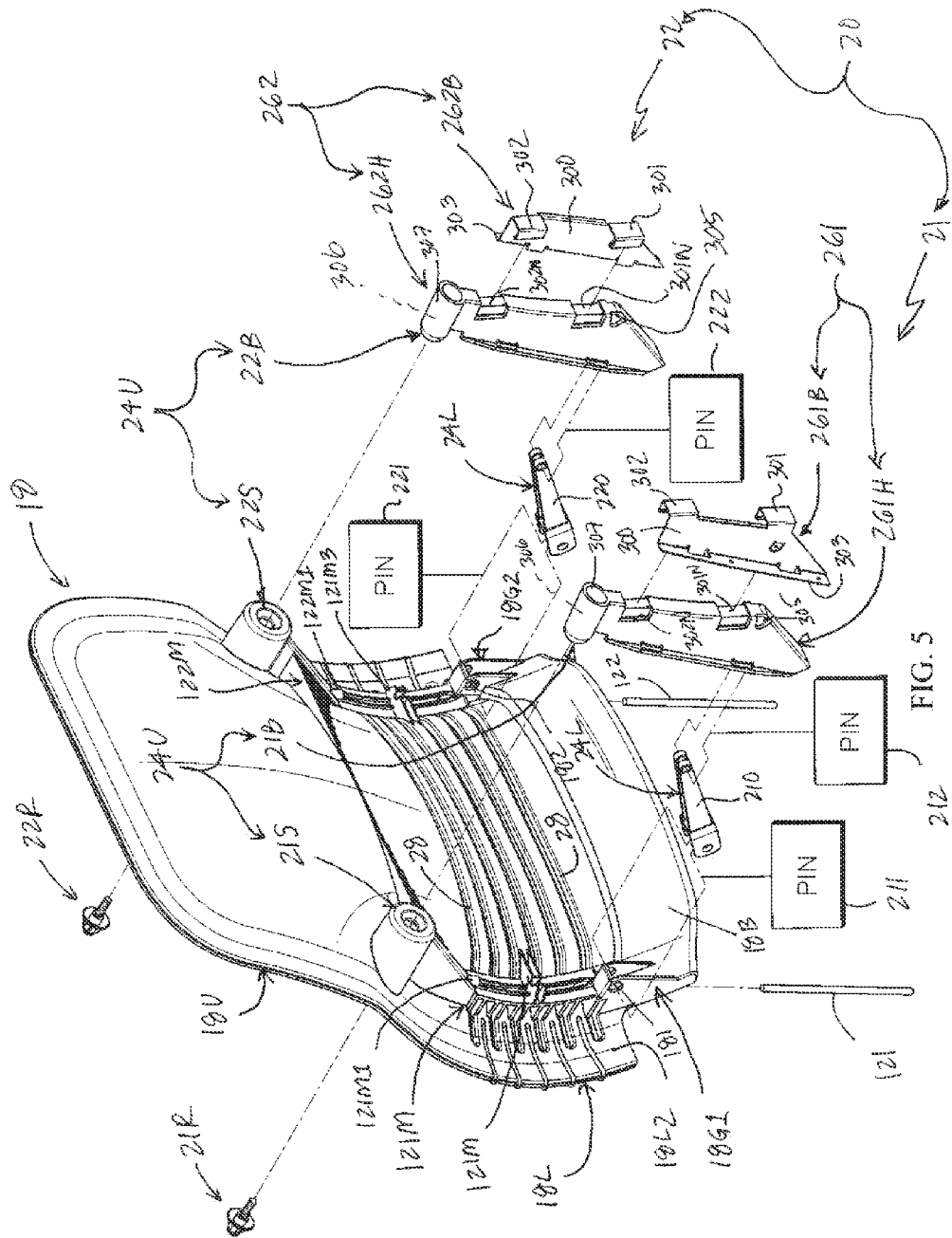
FIG. 5 is an exploded rear perspective view of the backrest of FIG. 1.

Backrest 16B includes a passenger-controlled deformable seat shell 18 as shown, for example, in FIGS. 4-6 supported on a compliant shell-motion controller 20 including separate first and second shell mounts 21, 22 coupled to a rear portion of deformable seat shell 18. Passenger-controlled deformable seat shell 18 varies predictably in shape between an initial (lordosis) position shown in FIG. 13 suited to support an upright seated passenger as suggested in FIG. 16, a transition (mid-range) position shown in FIG. 14 to support a seated passenger transitioning between upright and slouching positions as suggested in FIG. 17, and a final (kyphosis) position shown in FIG. 15 suited to support a slouching seated passenger as suggested in FIG. 18.

First shell mount 21 of compliant shell-motion controller 20 comprises a stationary first link foundation 261 and upper and lower motion-control links 24U, 24L coupled to deformable seat shell 18 and to stationary first link foundation 261 as suggested in FIGS. 4-6. Upper and lower motion-control links 24U, 24L are configured to change the shape of the deformable seat shell 18 under various loads F1, F2 applied to seat shell 18 by a seated passenger as suggested in FIGS. 13-15 to enhance the comfort of the seated passenger. In an illustrative embodiment, upper motion-control link 24U comprises a spheroidal (e.g. ball-and-socket) joint and lower motion-control link 24L comprises a pivotable strut 210 and pivot pins 211, 212 for opposite ends of pivotable strut 210.

Second shell mount 22 of compliant shell-motion controller 20 comprises a stationary second link foundation 262 and upper and lower motion-control links 24U, 24L coupled to deformable seat shell 18 and to stationary second link foundation 262. Upper and lower motion-control links 24U, 24L are configured to change the shape of the deformable seat shell 18 under various loads applied to deformable seat shell 18 by a seated passenger as suggested in FIGS. 13-15 to enhance the comfort of the seated passenger. In an illustrative embodiment, upper motion-control link 24U comprises a spheroidal (e.g. ball-and-socket) joint and lower motion-control link 24L comprises a pivotable strut 220 and pivot pins 221, 222 for opposite ends of pivotable strut 220.

Deformable seat shell 18 changes shape in response to any shift in torso position by a passenger seated on seat bottom 14 to cause rearwardly directed variable forces generated by the position-changing passenger to be applied to deformable seat shell 18 from top to bottom as suggested in FIGS. 16-18. Compliant shell-motion controller 20 is mounted in a stationary position relative to seat foundation 12 so as to allow free-pivoting movement of lower motion-control link 24L (about first and second pivot axes 24A1 and 24A2) and multi-axial free-rotating movement of upper motion-control link 24U (about an indefinite number of axes, which axes have a common center) included in compliant shell-motion controller 20 to control motion of deformable seat shell 18 relative to seat foundation 12 in response to forces applied by the torso of a passenger seated on seat bottom 14 as that passenger shifts position in vehicle seat 10 as suggested in FIGS. 13-15 and 16-18.

A stationary first link foundation 261 included in first shell mount 21 of compliant shell-motion controller 20 is coupled to lie in a stationary position on a portion 61 of a seat frame 16F included in backrest 16B as suggested in FIG. 3A. Lower motion-control link 24L included in first shell mount 21 is coupled at an inner end thereof to deformable seat shell 18 at first pivot axis 24A1 and at an outer end thereof to first link foundation 261 at second pivot axis 24A2 as suggested in FIGS. 4-6.

Figure 7:
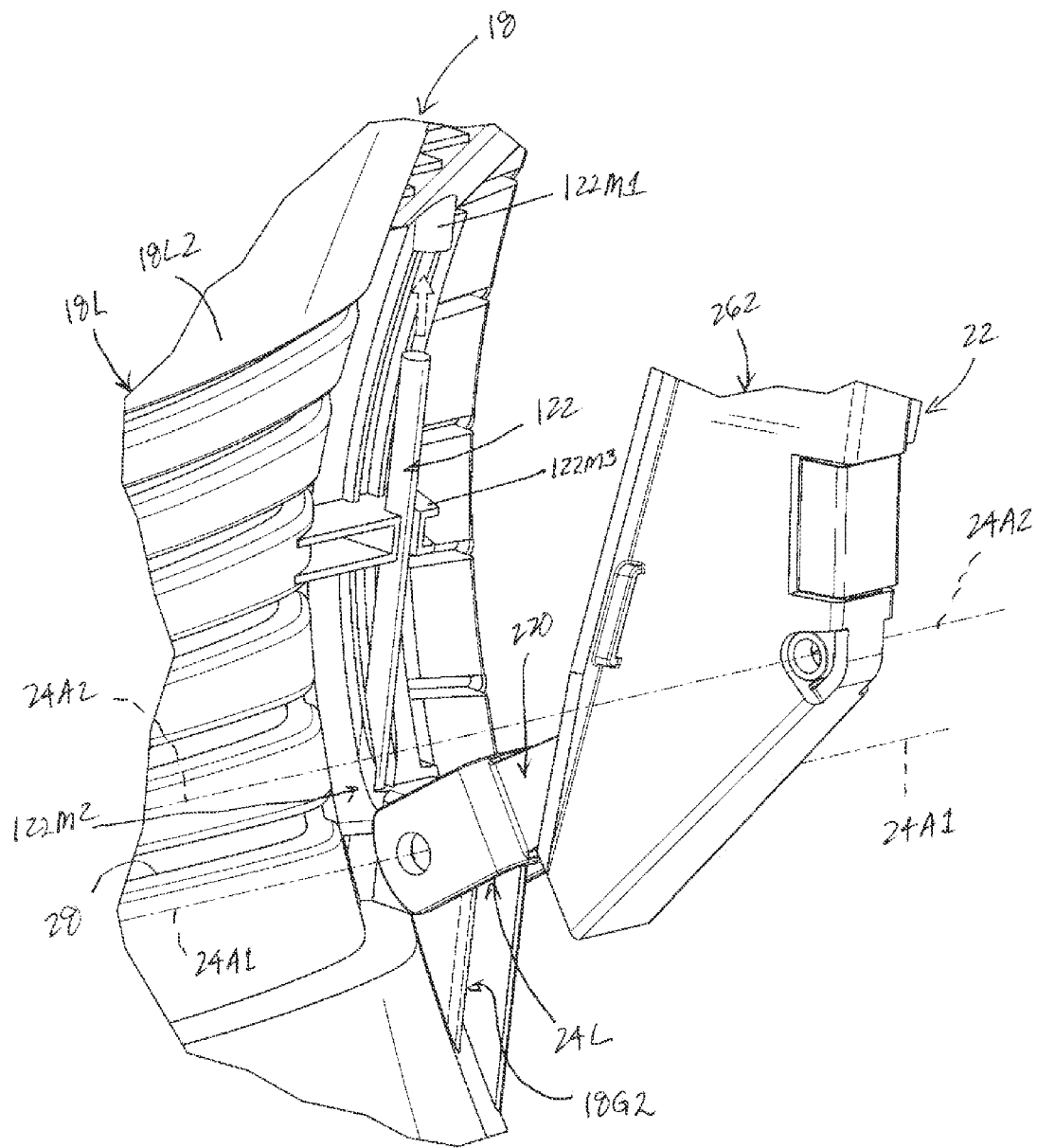
FIG. 7 is an enlarged view of a portion of FIG. 6, showing a lower motion-control link.
Figure 8:
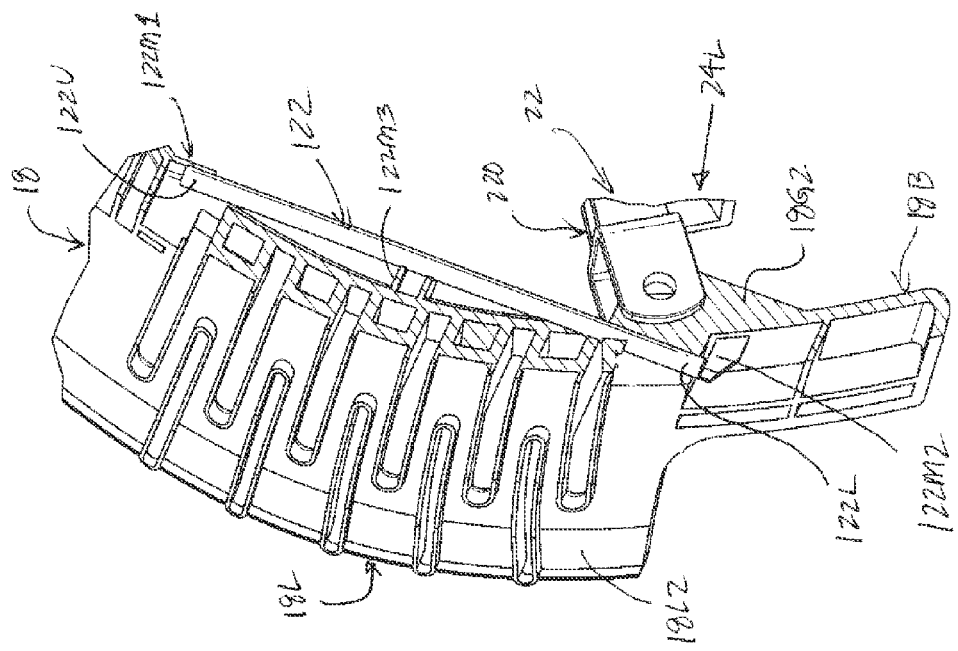
FIG. 8 is an enlarged view of a portion of the seat shell of FIG. 4, showing a return spring being assembled to the seat shell.
Figure 9:
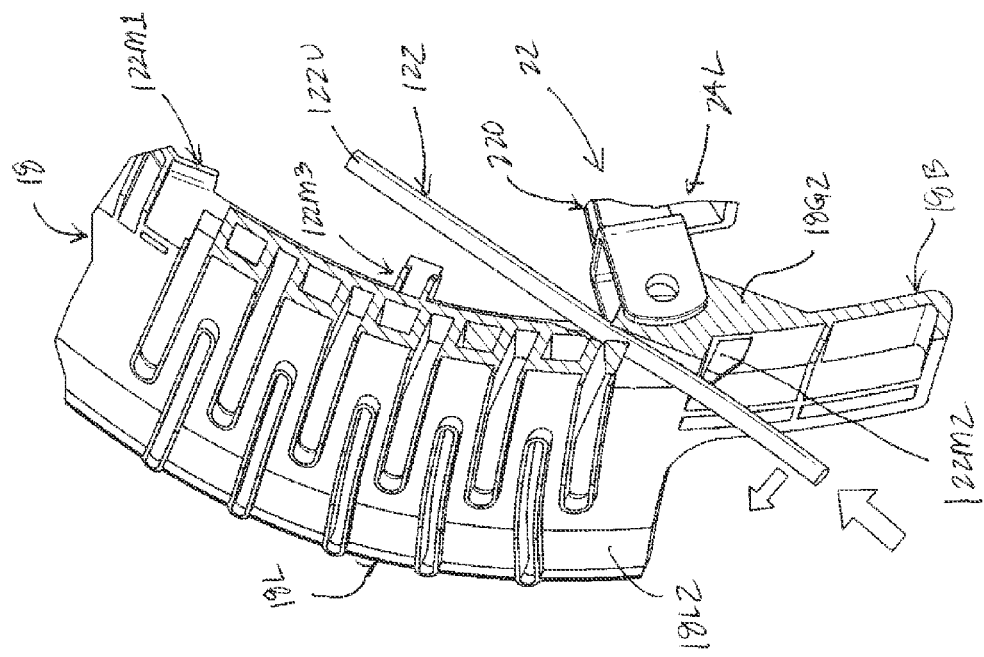
FIG. 9 is the enlarged view of FIG. 8, showing the return spring after assembly.

A stationary second link foundation 262 included in second shell mount 22 of compliant shell-motion controller 20 is coupled to lie in a stationary position on a portion 62 of a seat frame 16F included in backrest as suggested in FIGS. 3A and 7. Lower motion-control link 24L included in second shell mount 22 is coupled at an inner end thereof to deformable seat shell 18 at first pivot axis 24A1 and at an outer end thereof to second link foundation 262 at a second pivot axis 24A2 as suggested in FIGS. 4-6.

Seat back 16 includes backrest 16B, a headrest 16H arranged to extend upwardly from backrest 16B, and a support frame 16F arranged to extend upwardly from seat foundation 12 and lie behind backrest 16B as suggested in FIGS. 1-3B. Backrest 16B provides a compliant shell system that is coupled to support frame 16F to allow passenger-controlled deformable seat shell 18 to move relative to support frame 16F and change shape in response to forces applied to seat shell 18 by a position-changing passenger 11 seated on seat bottom 14.

In illustrative embodiments, seat back 16 also includes a seat cover 16C and frame shield 16S as suggested in FIG. 3A. Seat cover 16C is adapted to cover a front face of deformable seat shell 18 and include an outer trim cover 98 and an inner pad 100 interposed between outer trim cover 98 and deformable seat shell 18 as suggested in FIGS. 2 and 3A. Frame shield 16S is adapted to be mounted on a rear face of seat frame 16F to trap seat frame 16F between backrest 16B and frame shield 16S as suggested in FIGS. 3A and 3B. In an illustrative embodiment, headrest 16H includes a base 16HB coupled to an upper portion of support frame 16F and a pad 16HP coupled to frame shield 16S and mounted on an exposed portion of base 16HB as suggested in FIGS. 3A, 3B, and 6.

Backrest 16B of seat back 16 includes passenger-controlled deformable seat shell 18 and a compliant shell-motion controller 20. In illustrative embodiments, compliant shell-motion controller 20 includes a first shell mount 21 and a second shell mount 22 as suggested in FIGS. 5 and 6. Each of shell mounts 21, 22 includes an upper motion-control link 24U and a lower motion-control link 24L arranged to lie between deformable seat shell 18 and a portion 61 or 62 of seat frame 16F in backrest 16 as suggested in FIG. 6. Shell mounts 21 and 22 cooperate to provide means for supporting deformable seat shell 18 during deformation of seat shell 18 caused by shifting torso movement of a seated passenger and for coupling deformable seat shell 18 to support frame 16F. As shown in FIGS. 5 and 6, second shell mount 22 is arranged to lie in laterally spaced-apart relation to first shell mount 21 so that deformable seat shell 18 extends between and interconnects shell mounts 21, 22. In an illustrative embodiment, first shell mount 21 is coupled to forwardly facing surface 61 on seat frame 16F and second shell mount 22 is coupled to forwardly facing surface 62 on seat frame 16F as suggested in FIGS. 3A and 3B.

Figures 13, 14, 15:
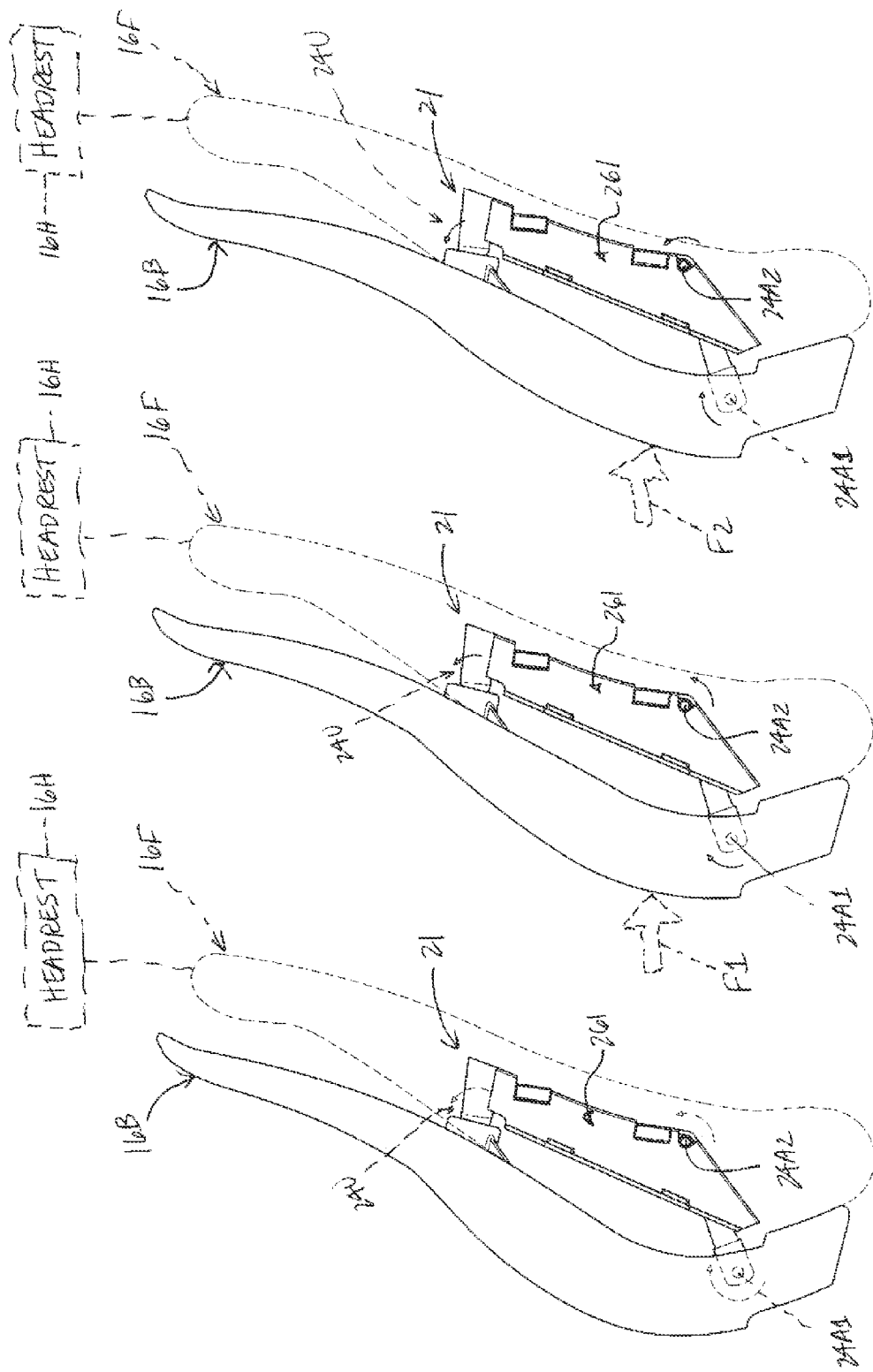
FIG. 13 is a side view of the backrest of FIG. 6, showing the deformable seat shell in an initial (lordosis) position.
FIG. 14 is a side view of the backrest of FIG. 6, showing the deformable seat shell in a mid-range or transition position.
FIG. 15 is a side view of the backrest of FIG. 6, showing the deformable seat shell in a final (kyphosis) position.

Upper and lower motion-control links 24U, 24L in each of shell mounts 21, 22 will move relative to first and second link foundations 261, 262 as suggested in FIGS. 13-15 in response to rearward forces (F1 or F2) applied to a forward-facing surface of deformable seat shell 18 by a seated passenger. The shape of deformable seat shell 18 is controlled in part by the design of links 24U, 24L in each shell mount 21, 22 at the seat-shell design stage. A two-sided system comprising laterally spaced-apart shell mounts 21, 22 coupled to left and right sides of deformable seat shell 18 allows the compliant shell provided by a backrest 16B in accordance with the present disclosure to be installed on a traditional vehicle seat foundation with no changes to a traditional vehicle seat architecture that has been designed to resist and accommodate external impact forces.

First shell mount 21 includes a stationary first link foundation 261 coupled to a forwardly facing surface 61 provided on seat frame 16F and arranged to face toward deformable seat shell 18 as suggested in FIG. 3A. Upper and lower motion-control links 24U, 24L in first shell mount 21 cooperate to provide means for supporting deformable seat shell 18 for controlled movement relative to first link foundation 261 in response to a force F applied in a rearward direction 19 (as suggested in FIG. 10) to deformable seat shell 18 by a seated passenger 11 sitting on seat bottom 14 so that the torso of the passenger is supported comfortably by deformable seat shell 18 in a matter suited to each passenger as a function of the orientation of the passenger's torso relative to seat bottom 14 as shown, for example, in FIGS. 16-18. Links 24U, 24L of shell mount 21 along with deformable seat shell 18 cooperate to provide deformable seat shell 18 with a comfortable, customized, and sympathetic shape suited to seated passengers 11 of various shapes, sizes, and postures. Stationary first link foundation 261 is coupled to support frame 16F of seat back 16 as suggested in FIGS. 2, 3A, and 3B to lie in a fixed position relative to seat foundation 12 and does not move relative to support frame 16F during movement of seat shell 18 relative to support frame 16F as suggested in FIGS. 13-15.

Lower motion-control link 24L of first shell mount 21 includes a pivotable strut 210, a first pivot pin 211, and a second pivot pin 212 as suggested in FIGS. 4 and 5. First pivot pin 211 is arranged to extend along first pivot axis 24A1 and is coupled to a first rigidified gusset 18G1 included in deformable seat shell 18 and to an inner end of pivotable strut 210 to provide a first revolute (pivot) joint J1 as suggested in FIG. 6. Second pivot pin 212 is arranged to extend along second pivot axis 24A2 and is coupled to a pin receiver 305 included in stationary first link foundation 261 to provide a second revolute (pivot) joint J2 as suggested in FIG. 6.

Upper motion-control link 24U of first shell mount 21 includes a ball 21B coupled to first link foundation 261, a ball-receiving socket 21S coupled to deformable seat shell 18, and a retainer 21R as shown, for example, in FIGS. 4 and 5. Retainer 21R is configured to provide means for retaining ball 21B in ball-receiving socket 21S while allowing relative movement between ball 21B and ball-receiving socket 21S during a change in the shape of the deformable seat shell 18 as suggested in FIG. 6A and FIGS. 6D1-6D3.

First link foundation 261 includes a holster 261H and a mounting bracket 261B as suggested in FIGS. 4 and 5. Mounting bracket 261B is configured to provide means for retaining holster 261H in a mounted position on support frame 16H of backrest 16B.

Second shell mount 22 includes a stationary second link foundation 262 coupled to a forwardly facing surface 62 provided on seat frame 16F and arranged to face toward deformable seat shell 18 as suggested in FIG. 3A. Upper and lower motion-control links 24U, 24L in second shell mount 22 cooperate to provide means for supporting deformable seat shell 18 for controlled movement relative to second link foundation 262 in response to a force F applied in a rearward direction 19 to deformable seat shell 18 by a seated passenger 11 sitting on seat bottom 14 so that the torso of the passenger is supported comfortably by deformable seat shell 18 in a matter suited to each passenger as a function of the orientation of the passenger's torso relative to seat bottom 14 shown in FIGS. 16-18. Links 24U, 24L of second shell mount 22 and deformable seat shell 18 cooperate with links 24U, 24L of first shell mount 21 to provide seat shell 18 with a comfortable, customized, and sympathetic shape suited to seated passengers 11 of various shapes, sizes, and postures. Stationary second link foundation 262 is coupled to support frame 16F of seat back 16 to lie in a fixed position relative to seat foundation 12 and does not move relative to support frame 16F during movement of seat shell 18 relative to support frame 16F. First and second link foundations 261, 262 cooperate to define a shell foundation associated with deformable seat shell 18 and coupled to support frame 16F of seat back 16 as shown, for example, in FIG. 3B.

Lower motion-control link 24L of second shell mount 22 includes a pivotable strut 220, a first pivot pin 221, and a second pivot pin 222 as suggested in FIGS. 4 and 5. Fist pin 221 is arranged to extend along first pivot axis 24A1 and is coupled to a second rigidified gusset 18G2 included in deformable seat shell 18 and to an inner end of pivotable strut 220 to provide a first revolute (pivot) joint J1 as suggested in FIG. 6. Second pin 222 is arranged to extend along second pivot axis 24A2 and is coupled to a pin receiver 305 included in stationary second link foundation 262 to provide a second revolute (pivot) joint J2 as suggested in FIG. 6.

Upper motion-control link 24U of second shell mount 22 includes a ball 22B coupled to second link foundation 262, a ball-receiving socket 22S coupled to deformable seat shell 18 and a retainer 22R as shown, for example, in FIGS. 4 and 5. Retainer 22R is configured to provide means for retaining ball 22B in ball-receiving socket 22S while allowing relative movement between ball 22B and ball-receiving socket 22S during a change in the shape of the deformable seat shell 18 as suggested in FIG. 6A and FIGS. 6D1 and 6D3.

Second link foundation 262 includes a holster 262H and a mounting bracket 262B as suggested in FIGS. 4 and 5. Mounting bracket 262B is configured to provide means for retaining holster 262H in a mounted position on support frame 16H of backrest 16B.

Passenger-controlled deformable seat shell 18 is arranged to extend along the back of a torso of passenger 11 seated on seat bottom 14 to provide lumbar and other spinal support as shown, for example, in FIGS. 16-18. Deformable seat shell 18 is made of a deformable construction and has a shape that varies in response to forces provided by passenger 11 to provide custom spinal column support suited to the needs and commands of each passenger 11 as the posture of that passenger in vehicle seat 10 changes as suggested in FIGS. 13-15 and 16-18. Deformable seat shell 18 is configured to bend and flex in a designed way to ensure proper pressure distribution and support through a wide range of seated postures. In illustrative embodiments, deformable seat shell 18 is movable relative to stationary link foundation 261, 262 that is arranged to lie in spaced-apart relation to deformable seat shell 18 as shown, for example, in FIGS. 4 and 5.

Deformable seat shell 18 is defined by a relatively thin pliable contoured sheet made of a pliable plastics material in an illustrative embodiment as suggested in FIGS. 2, 4, and 5. Deformable seat shell 18 includes a lower shell portion 18L and an upper shell portion 18U as suggested in FIG. 4. Lower shell portion 18L is arranged to lie between seat bottom 14 and upper shell portion 18U as suggested in FIG. 1. Upper shell portion 18U is arranged to lie between lower shell portion 18L and headrest 16H as also suggested in FIG. 1.

Lower shell portion 18L of deformable seat shell 18 is formed to include a series of generally horizontally extending slots 28 as shown, for example, in FIGS. 1-6. Slots 28 are formed to lie in vertically spaced-apart parallel relation to one another. Slots 28 are sized and shaped to facilitate controlled deformation of lower shell portion 18L of deformable seat shell 18 as suggested in FIGS. 13-15. In illustrative embodiments, each laterally extending slot 18 is filled with a flexure plug 128 shown diagrammatically in FIG. 3A. Flexure plugs 128 can be used to affix foam pad 100 and trim to the dynamic lumbar area of lower shell portion 18L while simultaneously closing off pinch points. Lower shell portion 18L is configured to have a forwardly facing convex surface 18L1 that is arranged to face toward the passenger and a rearwardly facing concave surface 18L2 that is arranged to face toward first and second link foundations 261, 262 of shell foundation 26 as suggested in FIG. 5.

Return springs 121, 122 are included in seat back 16B and coupled to deformable seat shell 18 as shown, for example, in FIGS. 4-6 and 7-9. Return springs 121, 122 cooperate to provide means for returning deformable seat shell 18 to the initial (lordosis) position shown in FIG. 13 from any transition (mid-range) position shown in FIG. 14 or the final (kyphosis) position shown in FIG. 15 as soon as the rearwardly directed forces (F, F1, F2) generated by a position-changing passenger seated on seat bottom 14 and previously applied by such passenger to deformable seat shell 18 have been withdrawn. In this way, return springs 121, 122 cooperate to cause deformable seat shell 18 to assume the initial (lordosis) position whenever vehicle seat 10 is unoccupied.

Return spring 121 is coupled to a first spring-mount fixture 121M included in a near side of lower shell portion 18L of deformable seat shell 18 and aligned with first shell mount 21 as shown, for example, in FIG. 6. First spring-mount fixture 121M includes (as suggested FIGS. 5 and 6) an upper tip-receiver socket 121M1 formed to include means for receiving an upper tip 121U of return spring 121, a lower tip-receiver socket 121M2 formed to include means for receiving an opposite lower tip 121L of return spring 121, and a central journal 121M3 located midway between sockets 121M1 and 121M2 and configured to receive a central portion of return spring 121.

Return spring 122 is coupled to a second spring-mount fixture 122M included in a far side of lower shell portion 18L of deformable seat shell 18 and aligned with second shell mount 22 as shown, for example, in FIG. 6. Second spring-mount fixture 122 includes (as suggested in FIGS. 5-9) an upper tip-receiver socket 122M1 formed to include means for receiving an upper tip 122U of return spring 122, a lower tip-receiver socket 122M2 formed to include means for receiving an opposite lower tip 122L of return spring 122, and a central journal 122M3 located midway between sockets 122M1 and 122M2 and configured to receive a central portion of return spring 122.

Each return spring 121, 122 is made of steel spring wire in an illustrative embodiment of the present disclosure. Use of wire spring ensures constant return force with little variation across a wide temperature range. Each return spring 121, 122 is slid into place along a journaled path provided at the bend line in deformable seat shell 18 and held in place by captive features 121M1, 2 and 122M1, 2 built into shell 18 as suggested in FIGS. 5-9.

Each link foundation 261, 262 is configured to mate easily with support frame 16F of seat back 16 to facilitate mounting of backrest 16B on support frame as suggested in FIGS. 3A-5. In illustrative embodiments, each mounting bracket 261B, 262B is riveted to a companion one of portions 61, 62 of support frame 16F and then each holster 261H, 261B is snapped into place on a companion one of the mounting brackets 261B, 262B.

Each mounting bracket 261B, 262B includes a plate 300, first and second slips 301, 302 along one edge of plate 300, and a mount flange 303 along an opposite edge of plate 300 as suggested in FIG. 5. Fasteners (e.g. rivets) (not shown) are used to anchor mount flange 303 to either portion 61, 62 of support frame 16F. Then each holster 261H, 262H is aligned with its companion mounting bracket 261B, 262B to cause each clip 301, 302 to nest in a companion clip-receiver notch 301N, 302N formed in the companion holster 261H, 262H as suggested in FIGS. 4 and 5. This alignment means functions to locate compliant shell-motion controller 20 in a predetermined position on support frame 16F with respect to the h-point.

Each holster 261H, 262H is formed to include a strut-receiving chamber 304 opening toward deformable seat shell 18 and formed to provide means for receiving on outer end of a companion pivotable strut 210, 220 therein as suggested in FIG. 4. As suggested in FIGS. 4-6, each holster 261H, 262H is formed to include a pin receiver 305 for receiving one of pivot pin 212 coupled to pivotable strut 210 or pivot pin 222 coupled to pivotable strut 220 to establish a second revolute (pivot) joint J2 for each of shell mounts 21, 22. Each pivot pin 212, 222 can be separate from or integral with companion pivotable strut 210, 212. Side walls of holsters 261H, 262H are reinforced to constrain lateral movement of pivotable struts 210, 220 received in strut-receiving chambers 304 so as to mitigate any displacement resulting from cross-vehicle loads. The area between holsters 261H, 262H is unobstructed as shown, for example, in FIGS. 3B and 6 offering volume for a rear passenger. In illustrative embodiments, an insert 306 is anchored in a sleeve 307 formed in each holster 261H, 262H to mate with a companion one of retainers 21R, 22R as suggested in FIGS. 4-6A to reestablish spheroidal joints 24U for each of shell mounts 21, 22.

Each rigidified gusset 18G1, 18G2 in deformable seat shell 18 is formed to include a companion pin receiver 181, 182 as suggested in FIG. 5. Each pin receiver 181, 182 is configured to receive one of pivot pin 211 coupled to pivotable strut 210 or pivot pin 221 coupled to pivotable strut 220 to establish a first revolute (pivot) joint J1 for each of shell mounts 21, 22. Each pivot pin 211, 221 can be separate from or integral with companion pivotable strut 210, 212.

Deformable seat shell 18 further includes a rigidified belt 18B coupled to a lower edge of lower shell portion 18L as suggested in FIGS. 3A-7. This rigidified belt 18B is configured to provide means for retaining a predetermined lateral contour of upper and lower shell portions 18U, 18L. Rigidified gussets G1, G2 and included in deformable seat shell 18 as suggested in FIG. 6 to stiffen an upper torso region of shell 18. Lower tip-receiver sockets 121M2, 122M2 for return springs 121, 122 are located along a common boundary between lower shell portion 18L and rigidified belt 18B as suggested in FIG. 6.

Backrest 16B is assembled and mounted on support frame 16F easily in just a few simple steps. First, mounting brackets 261B, 262B are anchored to support frame 16F. Second, holsters 261H, 262H are coupled to companion mounting brackets 261B, 262B. Third, pivotable struts 210, 220 are coupled to deformable seat shell 18 and to holster 261H, 262H using pivot pins 211, 212 and 221, 222. Fourth, deformable seat shell 18 is coupled to holsters 261H, 262H via upper motion-control links 24U using retainers 22R, 22R.

Figure 10:
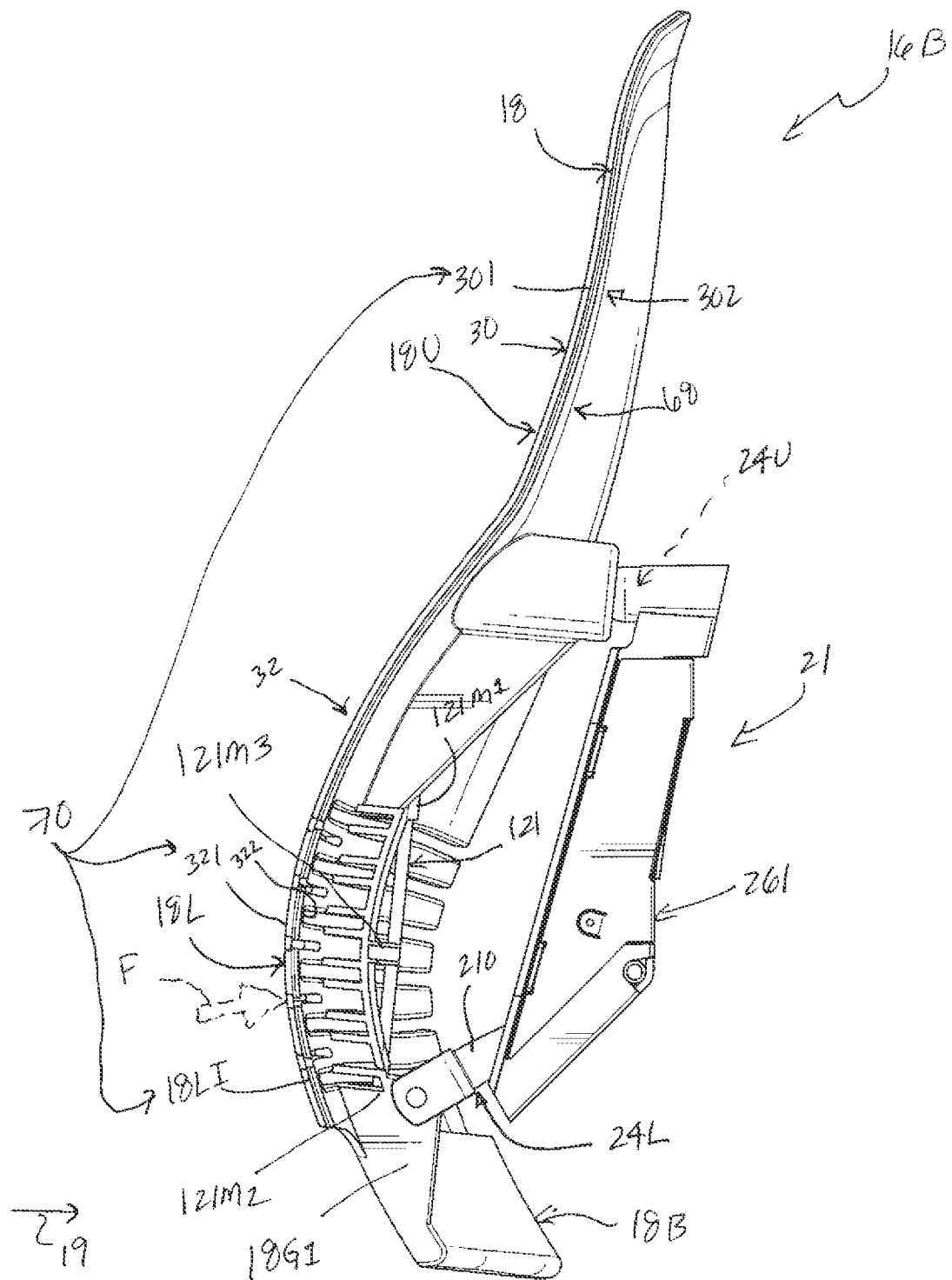
FIG. 10 is side view of the near side of the backrest of FIG. 6.
Figure 11:
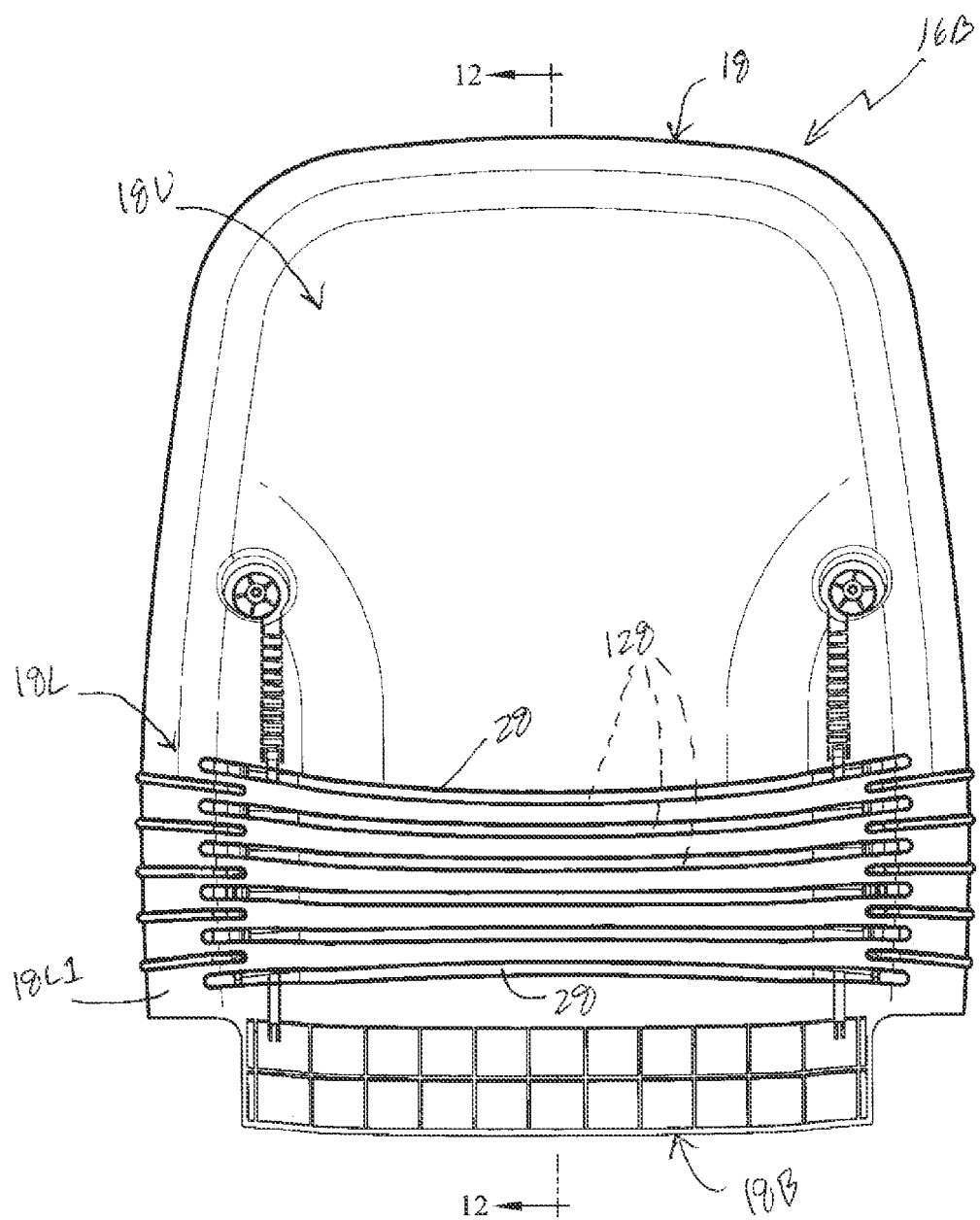
FIG. 11 is a front view of the backrest of FIG. 6.
Figure 12:
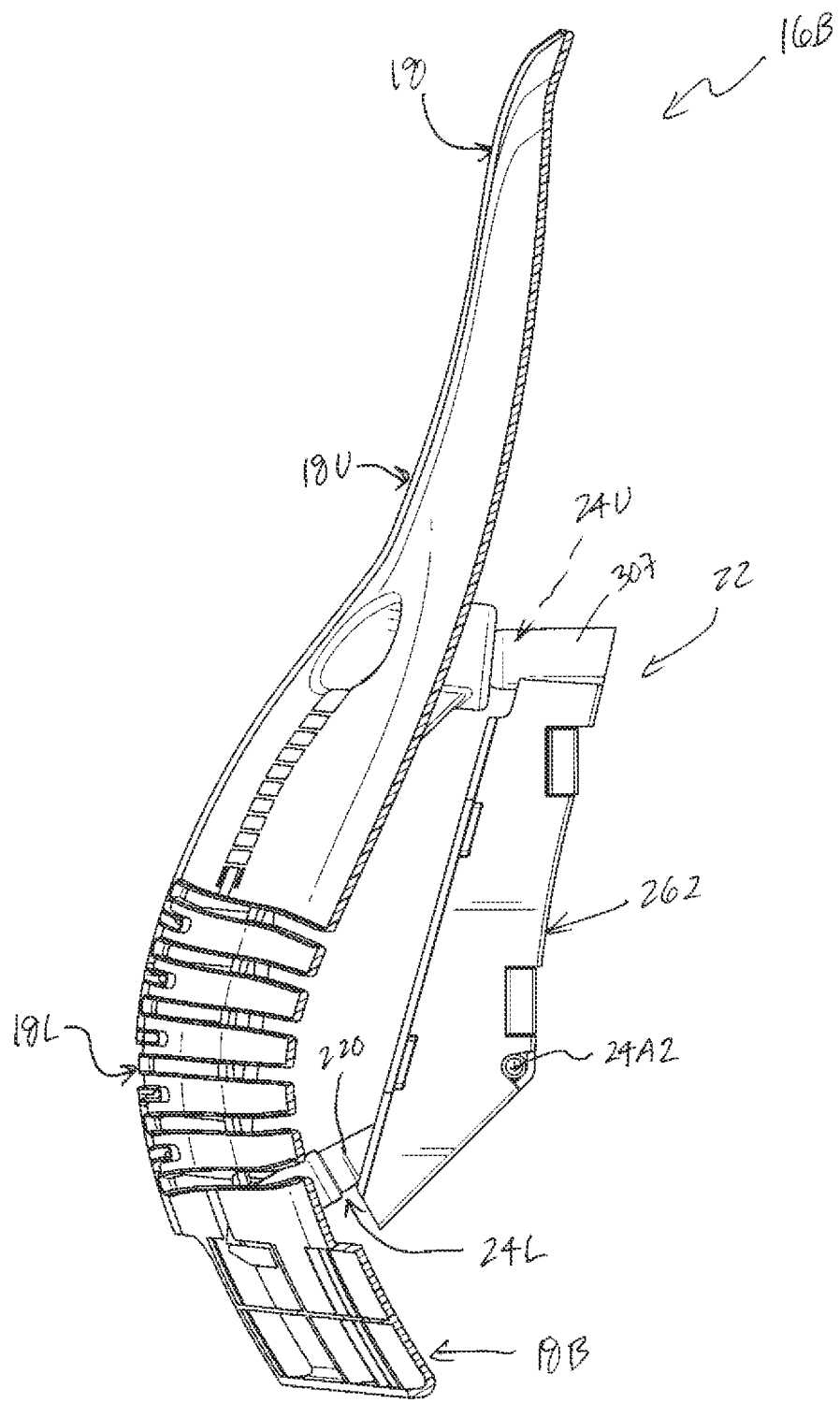
FIG. 12 is a cross-sectional view of FIG. 11.

Upper shell portion 18U includes an upper panel 30 and a lower panel 32 as shown in FIG. 4. Upper panel 30 is spaced-apart from lower shell portion 18L and is arranged to locate lower panel 32 between upper panel 30 and lower shell portion 18L. As shown in FIG. 10, upper panel 30 is configured to have a forwardly facing concave surface 301 that is arranged to face toward the passenger seated on seat bottom 14. An opposite rearwardly facing convex surface 302 is arranged to face toward shell foundation 26 as shown in FIG. 10. Lower panel 32 of upper shell portion 18U is configured to have a forwardly facing surface 321 and a rearwardly facing surface 322. Forwardly facing surface 321 of lower panel 32 transitions smoothly between forwardly facing concave surface 301 and forwardly facing convex surface 18L1. Rearwardly facing surface 302 of lower panel 32 transitions smoothly between rearwardly facing convex surface 302 and rearwardly facing concave surface 18L2. Together, rearwardly facing surfaces 302, 322, and 18L2 cooperate to define a rearwardly facing shell surface 68 as shown in FIG. 10. Forwardly facing surfaces 301, 321, and 18L1 cooperate to define a forwardly facing shell surface 70.

Compliant shell-motion controller 20 is configured to provide means attached to an automotive seat structure for controlling the shape of a comfort shell defined by deformable seat shell 18. When pressure is applied to the lower region (e.g., lower shell portion 18L) of deformable seat shell 18 by slouching, this causes the upper region (e.g., upper shell portion 18U) of deformable seat shell 18 to move forward following the seated passenger's shoulders. The end result is good contact to the passenger's entire back creating better pressure distribution. In illustrative embodiments, the design of compliant shell-motion controller 20 is very specific to ensure the proper amount of lumbar flattening coordinated with the proper amount of upper back movement.

Backrest 16B is configured in accordance with the present disclosure to use an upper motion-control link 24U in each shell mount 21, 22 to provide spheriodal joint 24U configured to define a rotationally compliant upper torso pivot. A lower belt region of deformable seat shell 18 is configured to rotate about an h-point.

Backrest 16B is configured in accordance with the present disclosure to provide a variable arc length at the centerline and a constant arc length at a bend line above the lumbar region of deformable seat shell 18. Backrest 16B is also configured to retain the shell contour (in its transverse cross-section) with the rigid lower belt region.

Compliant shell-motion controller 20 is configured to provide overall lateral stability of seat back 16 during cross car loading. Controller 20 mounts to the sides of support frame 16F. Controller 20 standardizes the central region of seat back 16 to provide live-back kinematics while the surrounding region of the shell 18 can be customized to accommodate various product platforms using mold inserts. Controller 20 provides predictable motion at the spinal contour by using a link of fixed length and offers geometric stability across wide temperature fluctuations. Asthetically, controller 20 provides an unobstructed view of the volume behind deformable shell 18 as suggested in FIG. 3B by being confined to the envelope of support frame 16F.

Figure 19:
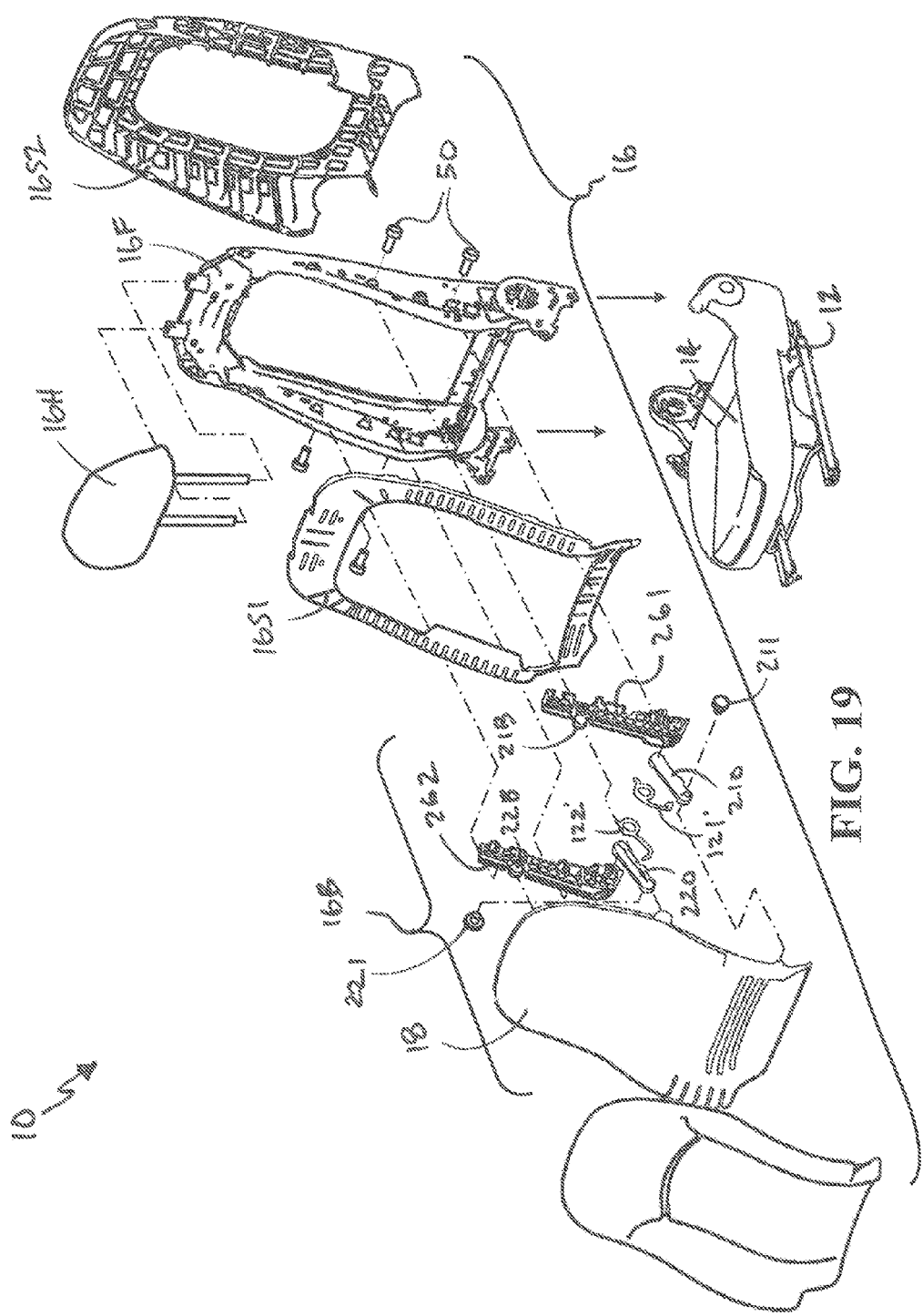
FIG. 19 is an exploded view of another embodiment of a vehicle seat that includes a deformable seat shell coupled to the seat support frame by a compliant shell-motion controller.

FIGS. 19-26 show various views of another embodiment of components of a vehicle seat 10 with a seat back 16 that includes a deformable seat shell 18. FIG. 19 is an exploded view of the vehicle seat 10, showing the seat foundation 12 adapted for attachment to a vehicle floor with seat bottom 14 positioned thereover. The seat back 16 includes back rest 16B coupled to seat support frame 16F. The seat back 16, including the support frame 16F, is coupled to the foundation 12 and extends upwardly from the foundation. This example includes front and rear frame shields 16S1 and 16S2, as well as headrest 16H. Front and rear frame shields 1651 and 1652 attach to each other with the support frame 16F located therebetween.

The backrest 16B includes the deformable seat shell 18 and compliant shell-motion controller 20. Shell-motion controller 20 couples the seat shell 18 with the support frame 16F via upper and lower motion-control links 24U, 24L, which are shown in FIGS. 20-24. At least one of the motion-control links 24U, 24L includes a spheroidal joint that is capable of motion around an indefinite number of axes which have one common center. In the illustrated example, the upper motion-control links 24U are spheroidal or ball-and-socket joints. As used herein, the term "spheroidal" refers to the general shape of the mating surfaces at the joint and is not meant to limit any shape to a full and/or perfect sphere shape. One or both mating surfaces at the joint may comprise only a partial spherical surface. For example, the spheroidal joints 24U in this example each include a ball 21B, 22B and a ball-receiving socket 21S, 22S. As shown in FIG. 25, each ball 21B, 22B is formed with parallel flat portions on opposite sides of the ball. Each ball 21B, 22B may be formed integrally as a single piece with the holsters 261H, 262H as shown, or as separately attached pieces. Also, the ball and socket configuration may be reversed so that the balls 21B, 22B are coupled to the deformable seat shell and the sockets 21S, 22S are coupled to the holsters 261H, 262H or link foundations 261, 262.

In the example of FIGS. 19-26, the link foundations 261, 262 are holsters 261H, 262H coupled with the frame support 16B without the separate mounting brackets shown in the previous figures. In other words, each link foundation 261, 262 may be a holster 261H, 262H with built-in features such as tabs or other snap-in features 261T, 262T that serve to locate the holsters with respect to the frame support 16B. In the illustrated example, threaded fasteners 50 are employed to attach each holster to the support frame, as shown in FIG. 19, but any suitable fastening technique may be used. Each fastener 50 extends at least partially through the frame support 16B and one of the holsters 261H, 262H.

Each of the illustrated holsters 261H, 262H extend between the upper and lower motion-control links 24U, 24L, and each holster is formed separately from the frame 16F. Providing the holsters 261H, 262H as link foundations 261, 262 that are formed as separate pieces from the frame 16F allows for pre-assembly of the compliant shell-motion controller 20 so that the back rest 16B can be constructed as a sub-assembly for later attachment to a seat support frame, with the upper and lower motion-control links 24U, 24L interconnected independently from the support frame.

Figure 22:
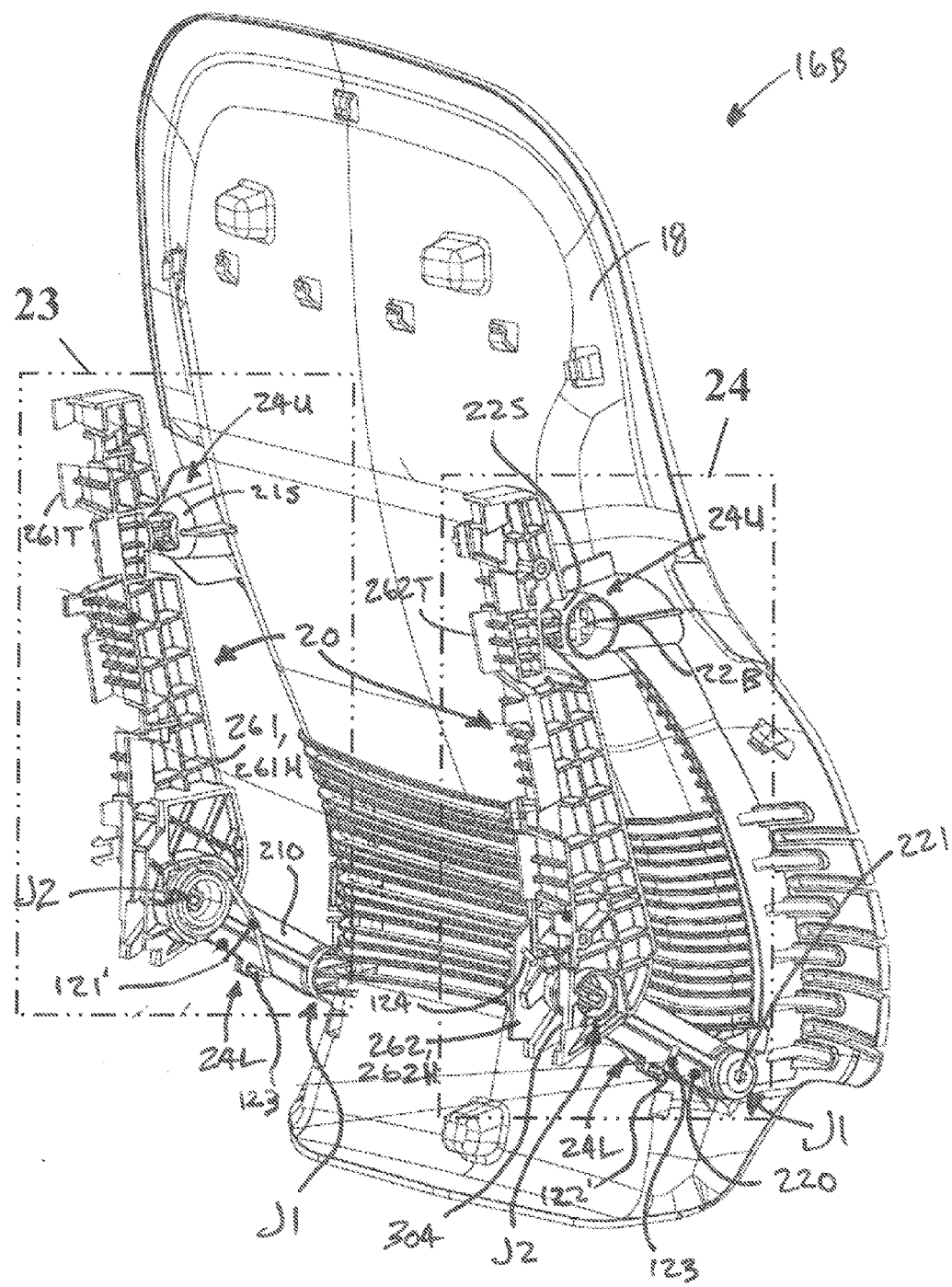
FIG. 22 is a rear perspective view of the backrest of FIG. 19.

The return springs 121', 122' in this example are shown in FIGS. 19, 22-23 and 26 and are torsional springs that bias the deformable seat shell toward the initial (lordosis) position. In particular, each of the illustrated return springs 121', 122' biases one portion of the shell-motion controller 20 against another portion of the shell-motion controller 20, whereas the above-described return springs bias one portion of the seat shell 18 against another portion of the seat shell. The illustrated torsional springs 121', 122' bias the pivotable struts 210, 220 against the holsters 261H, 262H. More particularly, a first end 123 of each torsional spring 121', 122' engages a tab or slot of each pivotable strut 210, 220, as shown in FIGS. 22-24 and 26. A second end 124 of each spring engages an inner wall of the holster receiving chamber 304 and/or extends at least partially through a fitted opening in each holster 261H, 262H as shown in FIGS. 22 and 24. Springs 121', 122' may be used alternatively or additionally with the return springs 121, 122 in the previous figures and are optional.

Another method of assembling the vehicle seat 10, including a method of assembly the backrest 16B is also shown and described, with particular reference to FIG. 25. In this example, the holsters 261H, 262H are coupled with the deformable seat shell 18 prior to being coupled to the seat frame 16F. Thus, the backrest 16B can be constructed as a sub-assembly, with or without decorative trim components disposed over the seat shell, for later assembly to the desired seat frame 16F. In this particular illustrated example, each pivotable strut 210, 220 is inserted into a slotted end or receiving chamber 304 of a holster 261H, 262H to form second revolute joint J2 at pin receiver 305 of each holster. In this case, the pivot pins 212, 222 are formed integrally as one piece with each holster 261H, 262H in the form of rectangular slides. Each slide 212, 222 slides into a mating groove at the receiving chamber 304 of the respective holster 261H, 262H. Once the slide 212, 222 is clear of the internal mating groove and aligned with the pin receiver 305, the strut 210, 220 is rotated (counter-clockwise arrow in FIG. 25) so that the slide and mating groove are not aligned to retain the slide at the pin receiver and form the revolute joint J2.

The upper motion-control links 24U may be formed by engaging each ball 21B, 22B with its respective socket 21S, 22S. In this case, each ball 21B, 22B is formed integrally as a single piece with a holster 261H, 262H and each socket 21S, 22S is formed integrally as a single piece with the deformable seat shell 18. The balls 21B, 22B in this example have parallel flat portions on opposite sides thereof so that each ball can fit into a rectangular opening of the respective receiving socket 21S, 22S for engagement. Each holster 261H, 262H in the illustrated example can thus be coupled with the seat shell 18 by inserting each ball into a socket while the holster is oriented at 90° from its final position, then rotating the holster 90° after the ball and socket are engaged to form the spheroidal joints 24U. This arrangement allows for the omission of the retainers 21R shown in the previous figures. The upper motion-control links 24U may be formed before or after formation of the second revolute joints J2. The 90° rotation of the holster 261H, 262H during assembly could also be a smaller angle.

First revolute joints J1 may then be formed at pin receivers 181, 182 of the deformable seat shell 18 to complete the lower motion-control links 24L. This may be completed as already described above via pivot pins 211, 221. In this case, the pivot pins 211, 221 are threaded fasteners that extend through an end of each pivotable strut—at an opposite end of each strut from second joint J2—and received by threaded pin receivers 181, 182. Where the pins 211, 221 are threaded fasteners, each may include a shoulder portion around which the strut can smoothly rotate.

Figure 20:
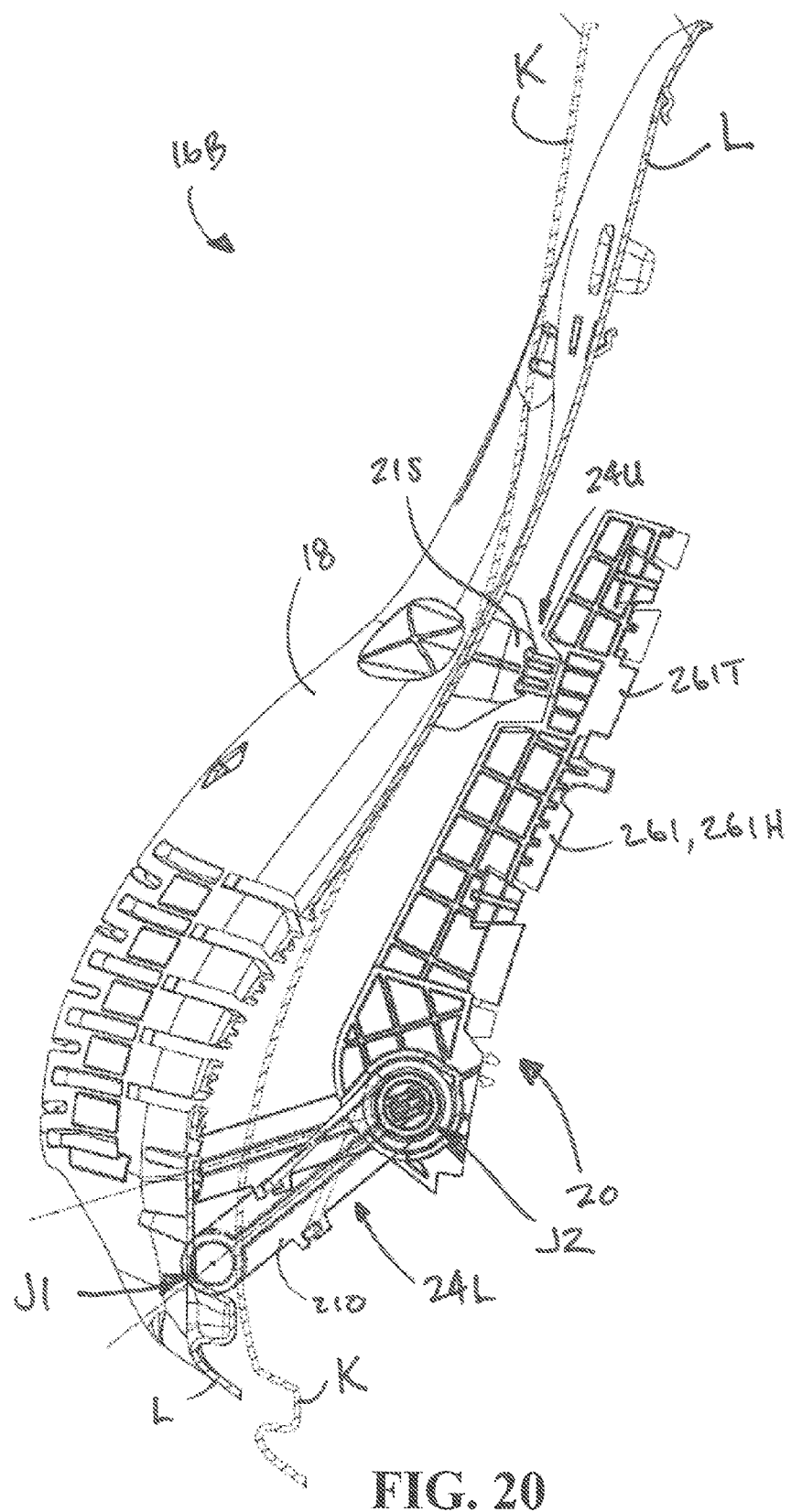
FIG. 20 is a side view of the backrest of the vehicle seat of FIG. 19, showing the seat shell at initial and final positions.
Figure 21:
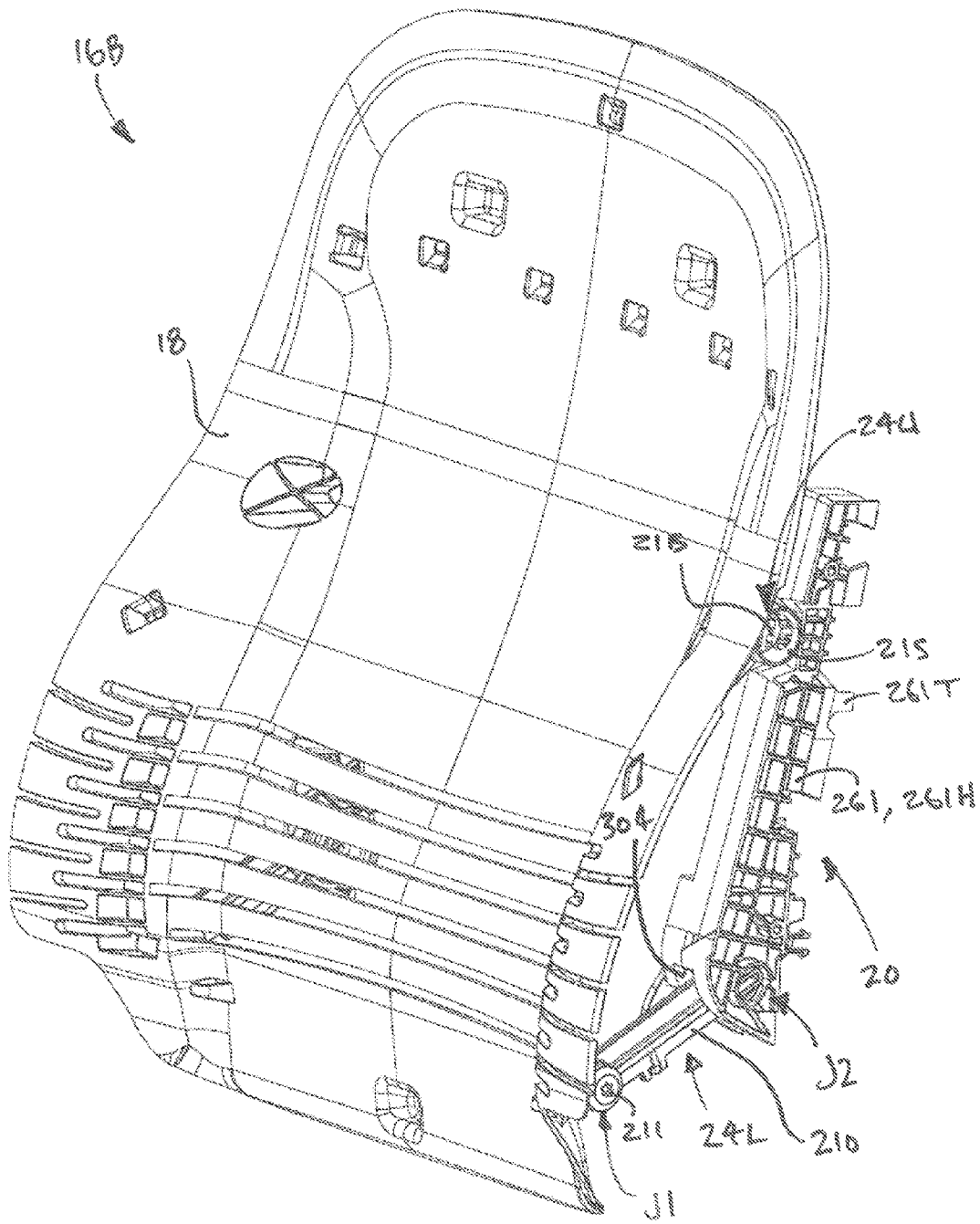
FIG. 21 is a front perspective view of the backrest of FIG. 19.
Figure 23:
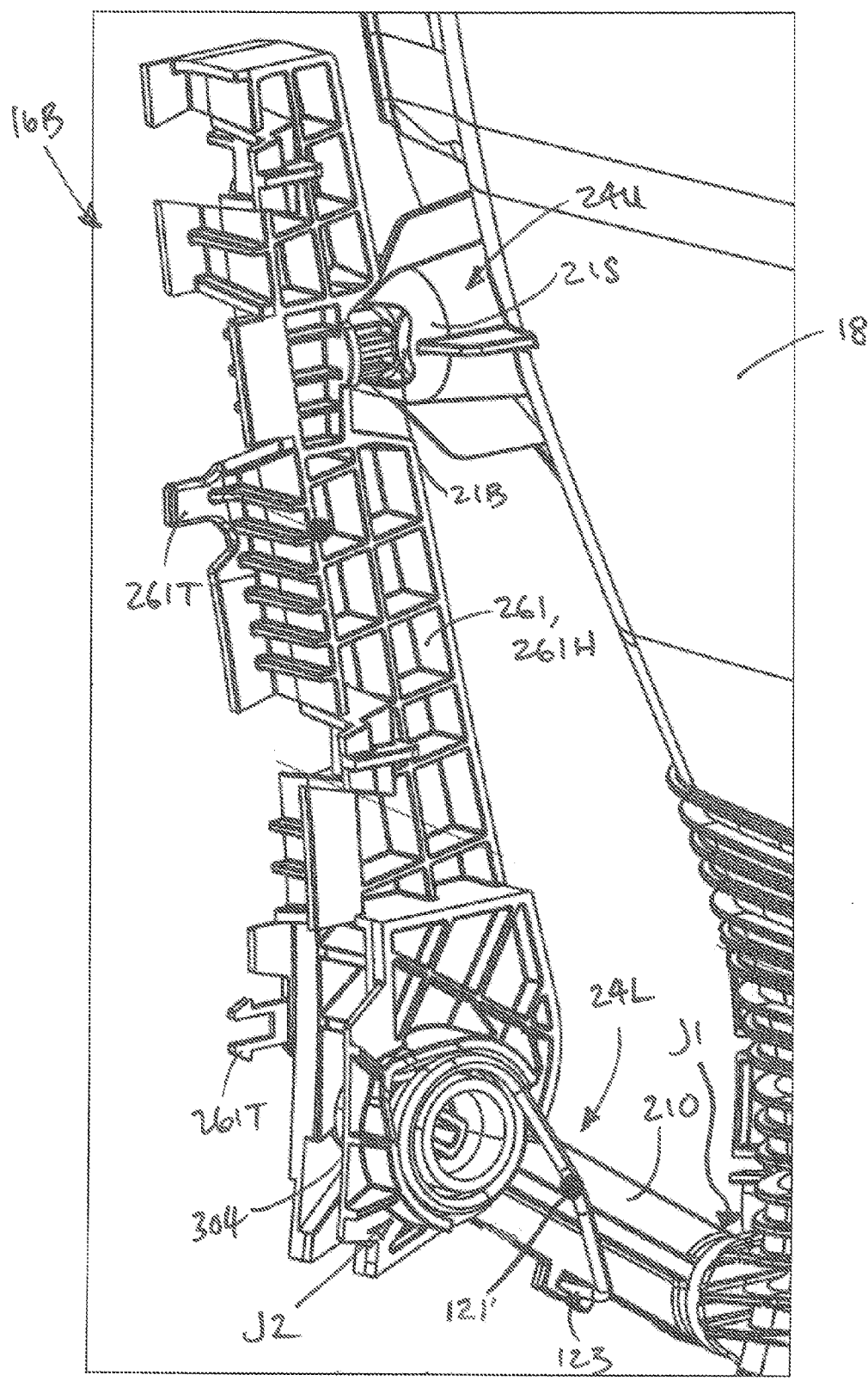
FIG. 23 is an enlarged view of a portion of FIG. 22, showing a link foundation coupled with the deformable seat shell.
Figure 24:
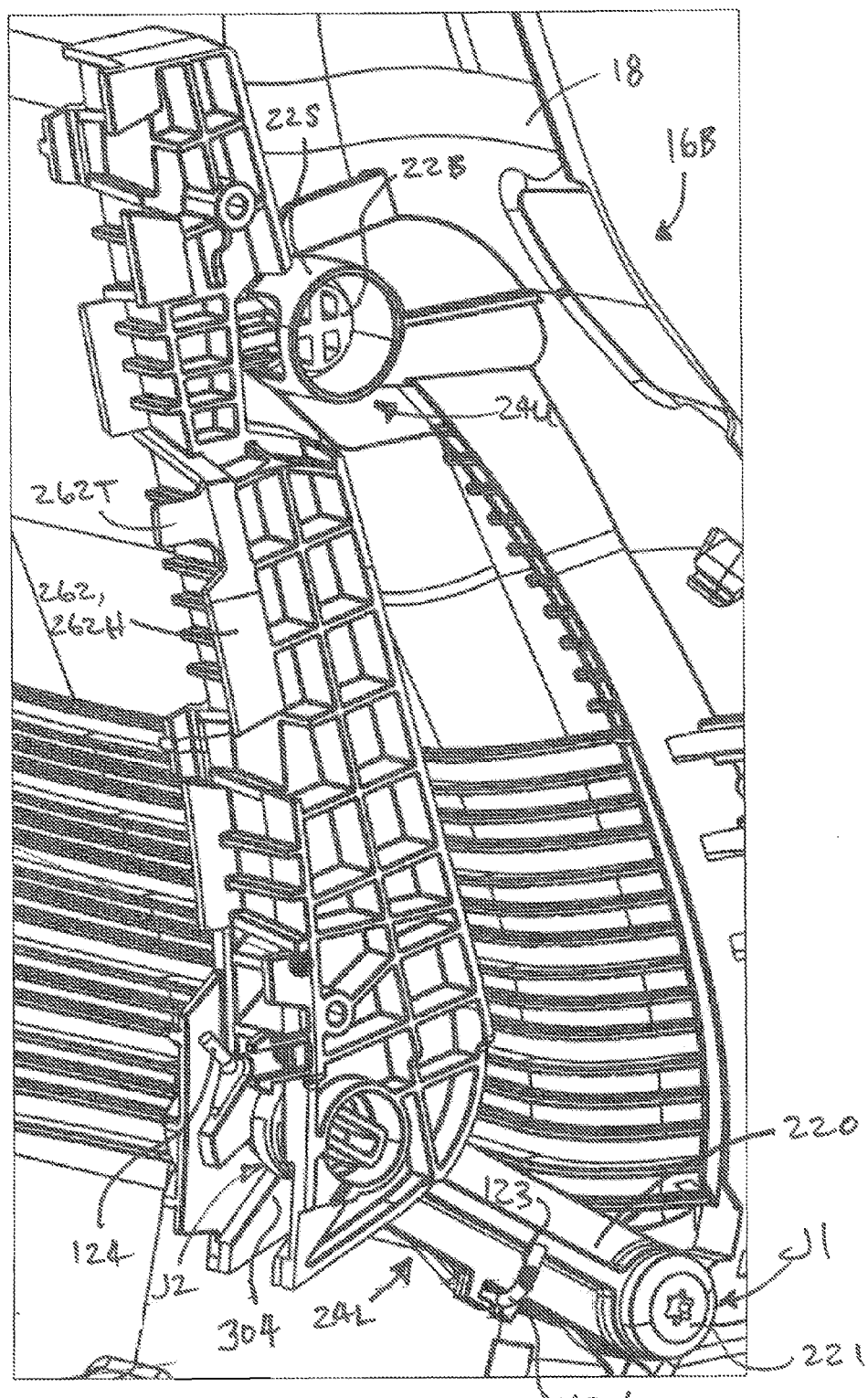
FIG. 24 is another enlarged view of a portion of FIG. 22, showing another link foundation coupled with the deformable seat shell.
Figure 25:
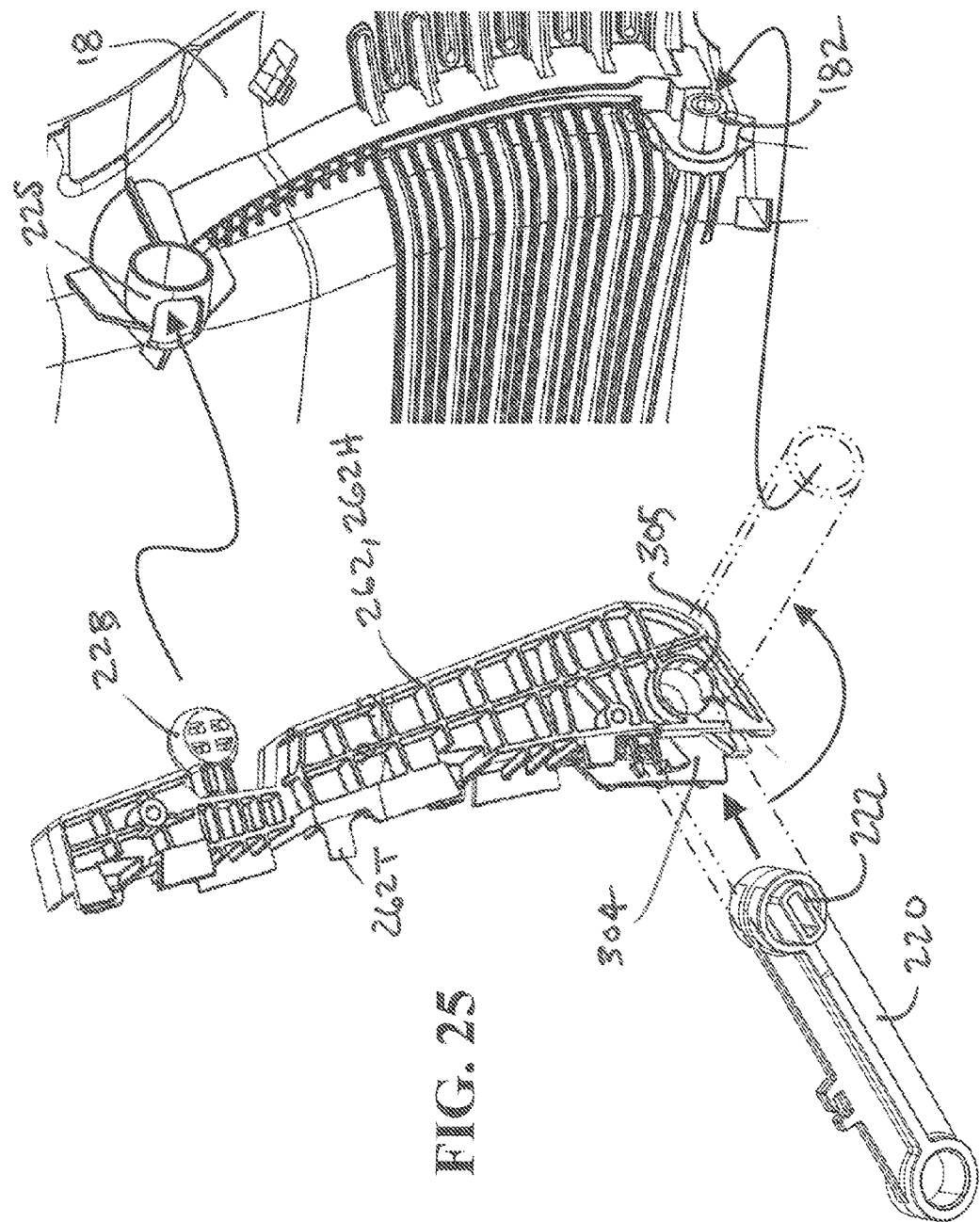
FIG. 25 illustrates a method of making the backrest of FIG. 19, showing the link foundation and the deformable seat shell of FIG. 24 uncoupled.
Figure 26:
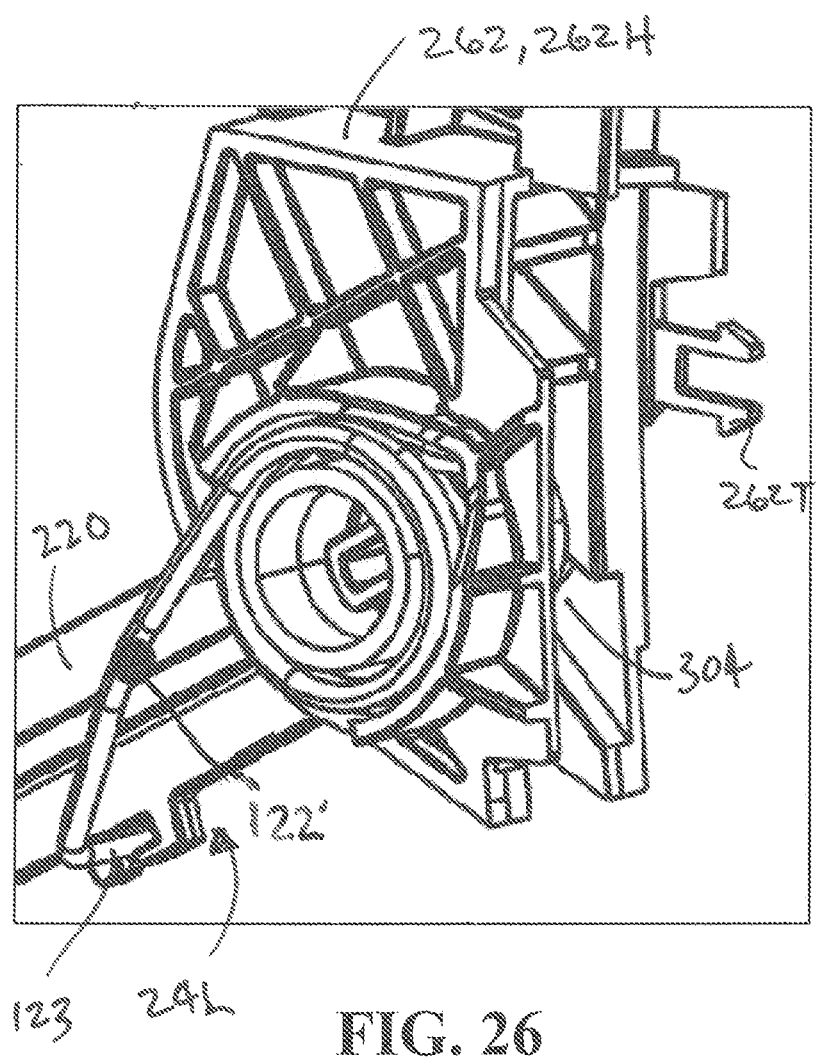
FIG. 26 is an enlarged view of the back side of the lower motion-control link formed by assembly of the components of FIG. 25, showing a torsional return spring.

The illustrative compliant motion-controller 20 is shown fully coupled with the deformable seat shell 18 in FIGS. 20-22, with the inside of link foundation 261 (holster 261H) shown in FIG. 23, and the outside of link foundation 262 (holster (262H) shown in FIG. 24. The assembled backrest 16B is shown in FIG. 20 with the deformable seat shell 18 in the initial lordosis position (L) and the final kyphosis position (K). As shown in FIG. 20, the link foundations 261, 262 do not move when the seat shell is deformed, as they are rigidly attached to the seat frame in use. Pivotable struts 210, 220 rotate about second revolute joint J2 to accommodate the changed shape. Though backrest 16B may be constructed so that its shape is user-selectable at the initial lordosis, or unloaded, position, the shape of the deformable seat shell at the initial unloaded position is not user-selectable in the embodiments shown in the figures. In other words, the illustrated vehicle seats utilize passive shape adjustment only, which may be less complex that active systems that seek to allow an occupant to change the shape of the seat back through means other than the load of his or her body.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat, comprising:
a foundation adapted for attachment to a vehicle floor;
an upwardly extending support frame coupled to the foundation;
a deformable seat shell adapted to assume various shapes between an initial position and a final position in response to variable rearward loads applied by the torso of a seated passenger; and
a compliant shell-motion controller that couples the deformable seat shell with the support frame via upper and lower motion-control links, wherein the upper motion-control link includes a spheroidal joint and the lower motion-control link includes a pivotable strut, the pivotable strut having a first end pivotally coupled with the deformable seat shell for movement about a first pivot axis, and a second end pivotally coupled with the support frame for movement about a second pivot axis such that lateral movement of the second end of the pivotable strut is constrained by a strut-receiving chamber coupled to the support frame at a fixed location.

2. A vehicle seat as defined in claim 1, wherein the compliant shell-motion controller comprises a link foundation attached to the support frame at a fixed location so that the link foundation does not move relative to the support frame during movement of the deformable seat shell, the link foundation being interconnected with the deformable seat shell by the upper and lower motion-control links.

3. A vehicle seat as defined in claim 1, wherein the compliant shell-motion controller comprises first and second shell mounts laterally spaced-apart from each other so that the deformable seat shell extends between and interconnects the shell mounts, each of the shell mounts including an upper motion-control link with a spheroidal joint and a lower motion-control link with a pivotable strut.

4. A vehicle seat as defined in claim 1, further comprising a return spring that biases the deformable seat shell toward the initial position.

5. A vehicle seat as defined in claim 4, wherein the return spring biases one portion of the deformable seat shell against another portion of the deformable seat shell.

6. A vehicle seat as defined in claim 4, wherein the return spring biases one portion of the shell-motion controller against another portion of the shell motion-controller.

7. A vehicle seat as defined in claim 1, wherein the shape of the deformable seat shell at the initial position is not user-selectable.

8. A vehicle seat, comprising:
a foundation adapted for attachment to a vehicle floor;
an upwardly extending support frame coupled to the foundation;
a deformable seat shell adapted to assume various shapes between an initial position and a final position in response to variable rearward loads applied by the torso of a seated passenger;
a stationary link foundation, including a holster coupled to the support frame at a fixed location, wherein the holster is formed separately from the support frame, the holster further comprising side walls and a strut-receiving chamber opening toward the deformable seat shell; and
upper and lower motion-control links that each pivotally couple the holster with the deformable seat shell, wherein the holster extends between and interconnects the upper and lower motion-control links, and
wherein at least one of the motion-control links comprises a pivotable strut having a first end pivotally coupled with the deformable seat shell and a second end pivotally coupled with the link foundation and received in the strut-receiving chamber of the holster such that the side walls of the holster constrain lateral movement of the pivotable strut.

9. A vehicle seat as defined in claim 8, wherein at least one of the motion-control links comprises a joint that is capable of motion around an indefinite number of axes which have one common center.

10. A vehicle seat as defined in claim 8, wherein said first end is coupled with the deformable seat shell for movement about a first pivot axis, and said second end is coupled with the link foundation for movement about a second pivot axis that is parallel to the first pivot axis.

11. A vehicle seat as defined in claim 8, further comprising a return spring that biases the deformable seat shell toward the initial lordosis position.

* * * * *